United States Patent
Nakamura et al.

(10) Patent No.: US 12,449,582 B2
(45) Date of Patent: Oct. 21, 2025

(54) LIGHT GUIDE AND VIRTUAL-IMAGE DISPLAY DEVICE

(71) Applicants: Naoki Nakamura, Saitama (JP); Masahiro Itoh, Kanagawa (JP); Yoshifumi Sudoh, Kanagawa (JP); Susumu Momma, Kanagawa (JP); Shun Okazaki, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP)

(72) Inventors: Naoki Nakamura, Saitama (JP); Masahiro Itoh, Kanagawa (JP); Yoshifumi Sudoh, Kanagawa (JP); Susumu Momma, Kanagawa (JP); Shun Okazaki, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 716 days.

(21) Appl. No.: 17/781,715

(22) PCT Filed: Jan. 6, 2021

(86) PCT No.: PCT/IB2021/050052
§ 371 (c)(1),
(2) Date: Jun. 2, 2022

(87) PCT Pub. No.: WO2021/148892
PCT Pub. Date: Jul. 29, 2021

(65) Prior Publication Data
US 2023/0003931 A1    Jan. 5, 2023

(30) Foreign Application Priority Data

Jan. 20, 2020 (JP) .............................. 2020-007085
Mar. 19, 2020 (JP) .............................. 2020-050321

(51) Int. Cl.
*G02B 27/01* (2006.01)
*F21V 8/00* (2006.01)

(52) U.S. Cl.
CPC ......... *G02B 6/0036* (2013.01); *G02B 6/0031* (2013.01); *G02B 6/0046* (2013.01); *G02B 27/0172* (2013.01)

(58) Field of Classification Search
CPC . G02B 27/0172; G02B 6/0031; G02B 6/0046
See application file for complete search history.

(56) References Cited

U.S. PATENT DOCUMENTS 10,571,699 B1 * 2/2020 Parsons ............... G02B 6/0028
2009/0251788 A1  10/2009 DeJong et al.
(Continued)

FOREIGN PATENT DOCUMENTS

CN   105259605 A   1/2016
CN   105572873 A   5/2016
(Continued)

OTHER PUBLICATIONS

Office Action issued Dec. 30, 2022 in Indian Patent Application No. 202217039954, 8 pages.
(Continued)

*Primary Examiner* — Alexander P Gross
(74) *Attorney, Agent, or Firm* — XSENSUS LLP

(57) ABSTRACT

A light guide includes light guiding members including first and second light guiding members, an optical entrance having a plane on which the light is incident, a light guiding unit to guide the light incident on the optical entrance with repeated reflection, a light beam ejection unit to eject the
(Continued)

light to an outside of the light guide, and an extraction unit to reflect the light guided by the light guiding unit toward the light beam ejection unit. The light guiding members guide and eject a light, and the second light guiding member is bonded to, at least, the light guiding unit of the first light guiding member.

11 Claims, 29 Drawing Sheets

(56) References Cited

U.S. PATENT DOCUMENTS

| | | | |
|---|---|---|---|
| 2011/0234941 A1* | 9/2011 | Gourlay | G02B 6/0068 |
| | | | 362/612 |
| 2016/0124223 A1 | 5/2016 | Shinbo et al. | |
| 2017/0045745 A1* | 2/2017 | Piskunov | G02B 27/0172 |
| 2017/0090094 A1 | 3/2017 | Ohsugi et al. | |
| 2017/0192239 A1 | 7/2017 | Nakamura et al. | |
| 2017/0285346 A1 | 10/2017 | Pan | |
| 2017/0315357 A1 | 11/2017 | Katano et al. | |
| 2017/0345391 A1 | 11/2017 | Usui et al. | |
| 2018/0059306 A1* | 3/2018 | Pan | G02B 27/0172 |
| 2018/0231783 A1 | 8/2018 | Weng et al. | |
| 2019/0004235 A1 | 1/2019 | Ohsugi et al. | |
| 2019/0353908 A1 | 11/2019 | Igarashi et al. | |
| 2020/0012093 A1 | 1/2020 | Marshall | |
| 2020/0150332 A1 | 5/2020 | Nakamura et al. | |

FOREIGN PATENT DOCUMENTS

| | | |
|---|---|---|
| CN | 107783293 A | 3/2018 |
| CN | 108445573 A | 8/2018 |
| CN | 110612470 A | 12/2019 |
| EP | 2 165 232 | 3/2010 |
| JP | 2006-501499 | 1/2006 |
| JP | 2010-123345 | 6/2010 |
| JP | 2010-533316 A | 10/2010 |
| JP | 2012-198260 | 10/2012 |
| JP | 2013-210633 | 10/2013 |
| JP | 2014-068365 | 4/2014 |
| JP | 2017-67891 A | 4/2017 |
| JP | 2017-120305 | 7/2017 |
| JP | 2017-122784 A | 7/2017 |
| JP | 2018-132603 A | 8/2018 |
| WO | WO2003/081320 A1 | 10/2003 |
| WO | WO2004/030160 A2 | 4/2004 |
| WO | 2009/009268 A1 | 1/2009 |
| WO | WO2009/074638 A2 | 6/2009 |
| WO | 2017/125992 A1 | 7/2017 |
| WO | WO2018/221026 A1 | 12/2018 |
| WO | 2019/111926 A1 | 6/2019 |

OTHER PUBLICATIONS

Office Action issued Jul. 4, 2023 in Japanese Patent Application No. 2020-007085, 10 pages.
International Search Report issued on Apr. 6, 2021 in PCT/IB2021/050052 filed on Jan. 6, 2021, 11 pages.
Office Action issued Dec. 26, 2023 in Japanese Patent Application No. 2020-050321, 7 pages.
Chinese Office Action issued Oct. 26, 2023, in corresponding Chinese Patent Application No. 202180009746.7, 9pp.

* cited by examiner

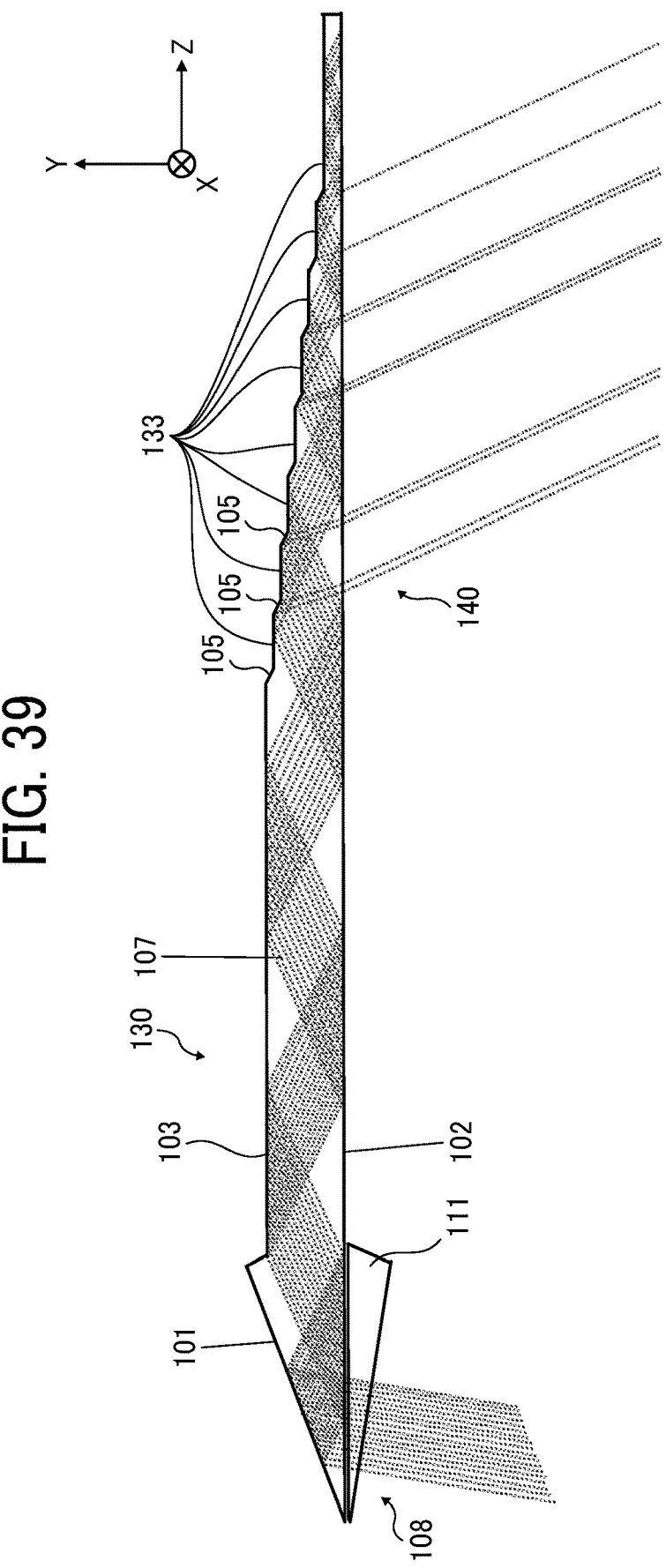

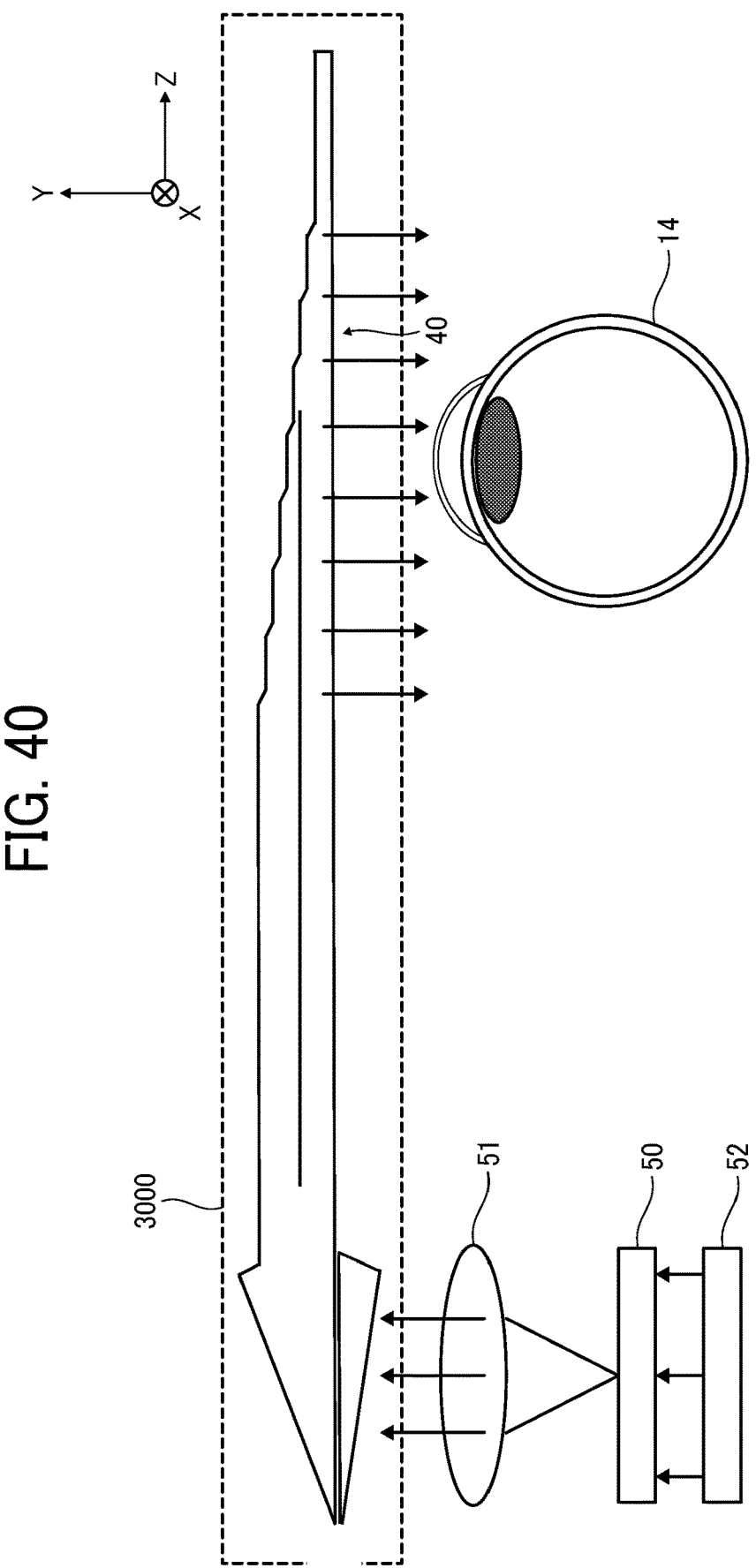

LIGHT GUIDE AND VIRTUAL-IMAGE DISPLAY DEVICE

CROSS-REFERENCE TO RELATED APPLICATIONS

The present application is based on PCT filing PCT/IB2021/050052, filed Jan. 6, 2021, which claims priority to Japanese Patent Application No. 2020-007085, filed Jan. 20, 2020 and Japanese Patent Application No. 2020-050321 filed Mar. 19, 2020, the entire contents of each of which is incorporated herein by reference.

TECHNICAL FIELD

Embodiments of the present disclosure relate to a light guide and a virtual-image display device.

BACKGROUND ART

As a virtual-image display device, for example, a head-mounted display (HMD) is commonly used. Such a head-mounted display (HMD) is classified into a transparent type and a nontransparent type, and for example, Google glass (registered trademark) is well known in the art as a see-through HMD of transparent type through which an image can be seen. Various kinds of HMD of nontransparent type that achieves deep immersive simulation are also released by several companies. Regarding the size of a virtual image that is visually recognized by human through a virtual-image display device, a HMD of transparent type is used in combination with an external information terminal, or is used in combination with the augmented reality (AR) technologies. For this reason, a small and portable HMD is desired. By contrast, a HMD of nontransparent type is used for, for example, games or virtual-reality (VR) technologies. For this reason, a HMD that realizes immersive feeling and a wide viewing angle is desired. Some common characteristics of a virtual-image display device are given below. The viewing angle of a virtual-image display device that is dedicated to its downsizing and reduction in thickness of the main body tends to be narrow. By contrast, when the viewing angle of the display area is widened, the size of the main body of the virtual-image display device tends to be increased and its thickness tends to be increased. Currently, a HMD of transparent type whose thickness is reduced is demanded, and a wide viewing angle is also required for such a HMD of transparent type whose thickness is reduced is demanded.

The technologies are known in the art that satisfies such demands as described above (see, for example, PTLs 1 to 3). However, in such technologies known in the art, the light is guided to the eyes of a user as the light is ejected to the outside of a light guide by the reflection by a plurality of mirrors or a plurality of micro parts. In such technologies or configurations, some of the light beams that are guided through a light guide at varying angles that correspond to the multiple pixels of an image formed by an image display element does not hit any of a plurality of mirrors or a plurality of micro parts. Given these circumstances, a dropout error of brightness may occur on a virtual image that is observed.

In order to deal with the above technical problems, a method of preventing dropout error of brightness has been suggested as follows (see, for example, PTL 4). In such a method of preventing dropout error of brightness, a layer that splits the light is disposed inside the light guide, and the timing at which light beams with varying angles that are guided through a light guide plate are reflected is adjusted. Due to such a configuration, there is a high probability that light beams with angles that tend to cause a dropout error of brightness hit a plurality of mirrors or a plurality of micro parts.

A virtual-image display device with a light guide is known in the art as a device that magnifies a two-dimensional (2D) image by a virtual image optical system and display a magnified virtual image such that an observer or user can observe the displayed magnified virtual image. As an example configuration of such a virtual-image display device with a light guide, head-mounted displays (HMDs) are known in the art. Such head-mounted displays (HMDs) are classified into HMDs of a transparent type and HMDs of a nontransparent type. For example, Google glass (registered trademark of Google limited liability company (LLC) in the US) is well known in the art as a see-through HMD of transparent type through which an image can be seen.

Such a see-through HMD of transparent type is used in combination with an external information terminal, or is used in combination with, for example, the augmented reality (AR) technologies. For this reason, a small and portable HMD is desired. HMDs of nontransparent type are used when, for example, movies are watched, games are played, or when virtual-reality (VR) technologies are provided. For this reason, HMDs that realize immersive feeling and a wide viewing angle are desired.

In HMDs of transparent type, reduction in thickness, reduction in size, and a wide viewing angle are desired. Moreover, it is desired that reduction in transmittance of extraneous light or reduction in reflectivity of light is prevented from occurring, and that a ghost image is prevented from being formed. As a feature that meets such demands, a light guide plate as disclosed in, for example, PTL 3 and a virtual-image display device with the light guide are known in the art.

The light guide plate disclosed in PTL 3 includes a first total reflection plane and a second total reflection plane that face each other and extend in the same direction. The light guide plate disclosed in PTL 3 turns the optical path between such a pair of reflection planes, and guides the light toward the light beam ejection unit that has an image extraction unit. The image extraction unit includes a plurality of first planes that extend with inclination toward the inside of a light guiding unit on the far side of the image extraction unit in the light-guiding direction, and a plurality of second planes that form an obtuse angle with the multiple first planes. The multiple first planes and the multiple second planes are alternately arranged. A virtual-image display device may be implemented using the light guide plate as configured above.

When a wide viewing angle is to be achieved using the light guide plate disclosed in PTL 3, a problem is known in the art that an unevenness in brightness or dropout error of brightness occurs on a virtual image. The reasons why such an unevenness in brightness or dropout error of brightness occurs on a virtual image are described with reference to a control sample where the light guide plate according to the disclosure of PTL 3 is used as illustrated in FIG. 39.

As illustrated in FIG. 39, a light guide plate is a horizontally-oriented plate-like member made of a transparent material. For example, such a light guide plate is placed in front of the eyes of human like glasses. With the use of such a light guide plate, an image can be observed through the light that is ejected through a light beam ejection unit, and the sight ahead of the light guide plate can be observed through the light that passes through the light guide plate. In FIG. 39, the directions perpendicular to the sheet of paper indicate the up-and-down directions of the light guide plate under normal operating conditions, and these directions are referred to as the X-directions. The up-and-down directions in FIG. 39 that are perpendicular to the X-directions are referred to as the Y-directions. In other words, the forward and backward directions under in-use conditions are referred to as the Y-direction. The directions that are orthogonal to both the X-direction and the Y-direction, which correspond to the right and left directions in FIG. 39, are referred to as the Z-direction.

In the light guide plate as illustrated in FIG. 39, an optical entrance 108 is illustrated on a bottom-left side, and a light beam ejection unit 140 is illustrated on a bottom-right side. Moreover, a light guiding unit 130 is illustrated between the optical entrance 108 and the light beam ejection unit 140. The optical entrance 108 includes a prism 111 on which the light is incident, and includes a mirror 101 that reflects the incident light, which has passed through the prism 111, toward the light guiding unit 130.

The light guiding unit 130 according to the present control sample includes a first reflection plane 102 and a second reflection plane 103 that are parallel with each other and totally reflect the light reflected by the mirror 101 in alternating sequence in a zigzag manner to guide the light toward the light beam ejection unit 140. The second reflection plane 103 functions as a plurality of image extraction units 105 and a plurality of sub-reflection planes 133 at the portions that face and correspond to the light beam ejection unit 140. These image extraction units 105 and the multiple sub-reflection planes 133 are alternately arranged in the Z-direction.

Each one of the multiple image extraction units 105 is an inclined plane at a certain angle that steps down toward the light beam ejection unit 140, and the multiple sub-reflection planes 133 are parallel to the first reflection plane 102. For this reason, the thickness of light guide plate in the forward and backward directions gradually gets thinner in stages toward the light beam ejection unit 140.

The light that is emitted from, for example, a prescribed image forming element is collimated and is incident on the light guide plate through the optical entrance 108. Then, the light is obliquely reflected by the mirror 101 toward the first reflection plane 102, and is obliquely reflected by the first reflection plane 102 toward the second reflection plane 103. As a result, the light travels toward the light beam ejection unit 140 with reflection at a certain incident angle and reflection angle in a zigzag manner between the first reflection plane 102 and the second reflection plane 103.

Once the light reaches each one of the multiple image extraction units 105, each one of the multiple image extraction units 105 reflects some of the incident light toward the light beam ejection unit 140. The light that is reflected by each one of the multiple image extraction units 105 passes through the light beam ejection unit 140, and is incident on the eyes of human that are located to face the light beam ejection unit 140. An image that is formed by the image forming element or the like can be observed by the eyes of a human through the light that is reflected by each one of the multiple image extraction units 105. The light ahead of the light guide plate is introduced through the light beam ejection unit 140, and the introduced light is observed by the eyes of human. Due to this configuration, the sight ahead of the light guide plate can be observed together with the above image.

According to the flat light guide plate as illustrated in FIG. 39, the light with a relatively wide total-reflection angle with reference to a normal line to the principal plane of the light guide plate and the light with a relatively narrow total-reflection angle with reference to a normal line to the principal plane of the light guide plate are guided depending on the field angle of the image. Due to this configuration, as the light with a relatively wide total-reflection angle on the first reflection plane 102 and the second reflection plane 103 is guided, the field angle of a virtual image to be observed can be increased and the angle of visibility can be widened.

FIG. 39 is a diagram illustrating the optical path of the light that is transmitted within a known light guide plate from the optical entrance 108 that is disposed at left end of the light guide plate to the first reflection plane 102 and the second reflection plane 103 with a relatively wide total-reflection angle.

CITATION LIST

Patent Literature

[PTL 1]
  Japanese Patent Application Publication No. 2013-210633
[PTL 2]
  Japanese Patent Application Publication No. 2011-509417
[PTL 3]
  Japanese Patent Application Publication No. 2011-198260
[PTL 4]
  US Patent Application Publication No. 2017/0285346

SUMMARY OF INVENTION

Technical Problem

However, when a layer that splits the light is disposed inside the light guide, at least one split face needs to be provided for the light guide. More specifically, the light guide needs to be divided into a plurality of parts, and then these parts of the light guide need to be coupled to each other through the above at least one split face. Due to such a complicated configuration, the degree of difficulty tends to increase in production or manufacturing.

As described above, when the light that is transmitted within the light guide plate with a relatively wide total-reflection angle and the total-reflection intervals by the first reflection plane and the second reflection plane are wide, the irradiance levels of the light beams that reach the multiple image extraction units 105 tend to vary easily, and some of the multiple image extraction units 105 may partially be irradiated with no light. As a result, unevenness in brightness may occur on a virtual image that is observed through the light beam ejection unit 140. Alternatively, a dropout error of brightness may occur on a virtual image that can be observed through the light beam ejection unit 140. In other words, some of the light does not reach the light beam ejection unit 140, which is undesirable. In other words, when a virtual-image display device is configured using such a light guide plate as described above and when the viewing angle of the image is increased, unevenness in brightness or a dropout error of brightness occurs on a virtual image depending on the field angle or the position at which the virtual image is to be visually recognized, which is undesirable.

Solution to Problem

A light guide includes two or more light guiding members including a first light guiding member and a second light guiding member, an optical entrance having a plane on which the light is incident, a light guiding unit to guide the light incident on the optical entrance with repeated reflection, a light beam ejection unit to eject the light to an outside of the light guide, and a extraction unit to reflect the light guided by the light guiding unit toward the light beam ejection unit. The two or more light guiding members guide and eject a light, and the second light guiding member is bonded to, at least, the light guiding unit of the first light guiding member.

Advantageous Effects of Invention

According to one aspect of the present disclosure, a dropout error of brightness can be controlled, and a light guide with easy production can be achieved.

With the light guide and the virtual-image display device according to the embodiments of the present disclosure, an optical-path separator is arranged apart from the optical entrance and is disposed between the first reflection plane and the second reflection plane. As a result, an unevenness in brightness or dropout error of brightness that may occur on a virtual image to be observed can be reduced.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 39 is a plan view of a light guide according to a control sample of the above embodiments of the present disclosure FIG. 40 is a plan view of a virtual-image display device to which the light guide according to the above embodiments of the present disclosure is applied.

DESCRIPTION OF EMBODIMENTS

Some embodiments of a light guide and a virtual-image display device are described below in detail with reference to the accompanying drawings. Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Figure 1:
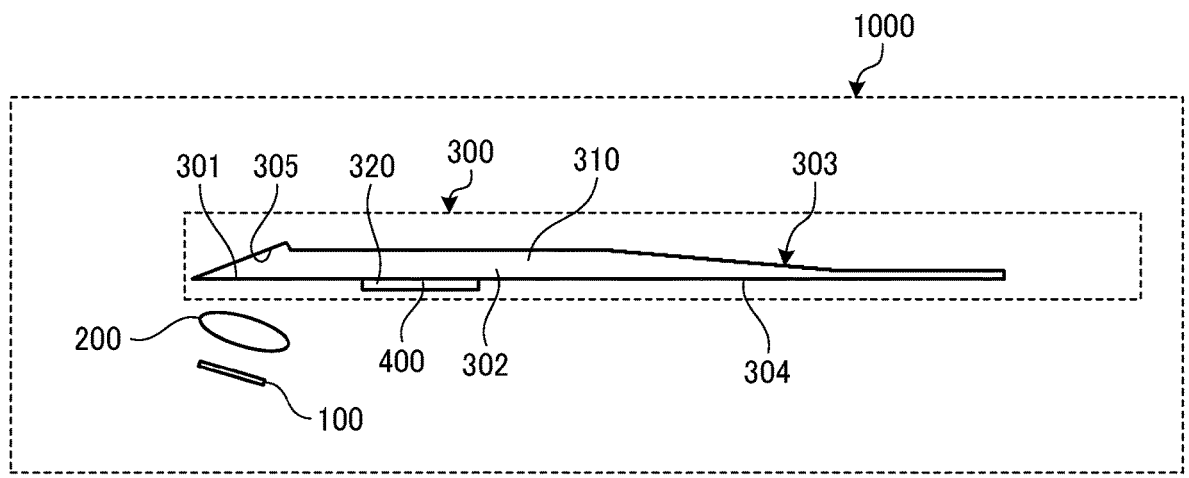
FIG. 1 is a schematic diagram illustrating a virtual-image display device provided with a light guide, according to a first embodiment of the present disclosure.

FIG. 1 is a schematic diagram illustrating a virtual-image display device 1000 provided with a light guide 300, according to a first embodiment of the present disclosure.

The virtual-image display device 1000 according to the first embodiment of the present disclosure is provided with an image display element 100, an optical system 200, and the light guide 300 according to the first embodiment of the present disclosure.

The image display element 100 is a device that emits the image light of an image that forms a virtual image that is projected and displayed through the light guide 300. The image display element 100 is a plate-like element that extends in the depth direction of the drawing. Various kinds of display element such as an organic light emitting diode (OLED) or a liquid crystal display (LCD) may be applied to the image display element 100. As long as it can display information such as an image, for example, a digital micromirror device (DMD) that is a micro-electromechanical systems (MEMS) in which a large number of minute specular surfaces (micromirrors) are arrayed on a plane, or a liquid crystal on silicon (LCoS) may be used for the image display element 100. In such a configuration, for example, a light-emitting diode (LED), a laser diode (LD), or a discharge lamp may be used for the light source that irradiates the image display element 100 with light.

The optical system 200 according to the present embodiment is configured by, for example, a plurality of optical lenses and a stop, and collimates the light beam that is emitted from the image display element 100 and includes the image data and changes the angle of the light beam that is emitted from the image display element 100 and includes the image data to a direction that is consistent with the varying positions of the image display element 100. Note that the light beam that includes the image data may be referred to simply as image light in the following description.

The light guide 300 that is used for the virtual-image display device 1000 guides the image light that is emitted from the image display element 100 and then is collimated by the optical system 200, which includes the image data, and ejects the image light to the eyes of human. As a result, a virtual image is displayed. The light guide 300 is a plate-like member that extends in the depth direction of the drawing. The light guide 300 according to the present embodiment includes an optical entrance 301, a light guiding unit 302, an extraction unit 303, and a light beam ejection unit 304. Moreover, the light guide 300 according to the present embodiment includes a reflector 305. The optical entrance 301, the light guiding unit 302, the extraction unit 303, the light beam ejection unit 304, and the reflector 305 extend in the depth direction of the drawing. In the longer-side directions of the light guide 300 that are the right and left directions of FIG. 1, a side at which the optical entrance 301 is arranged may be referred to as a base-end side, and a side apart from the optical entrance 301 may be referred to as a tip side view in the following description.

The optical entrance 301 is a site arranged at a site that faces the optical system 200 on which the image light that is emitted from the image display element 100 and then is collimated by the optical system 200 is incident. The reflector 305 is a site that reflects the light beam of the image light that has entered the light guide 300 through the optical entrance 301.

The light guiding unit 302 has a pair of principal planes that are approximately parallel to each other, and is a site that guides the light beam that is reflected by the reflector 305 with repeated total internal reflection between the pair of principal planes.

The extraction unit 303 according to the present embodiment is a site that reflects the light beam guided by the light guiding unit 302 toward the light beam ejection unit 304 so as to be extracted to the outside of the light guide 300. The light beam ejection unit 304 is a site through which the light beam, which is reflected by the extraction unit 303 so as to be extracted to the outside of the light guide 300, is ejected to the outside of the light guide 300. Due to this configuration, a user of the virtual-image display device 1000 can visually recognize a virtual image by looking at the light guide 300 from the light beam ejection unit 304 side.

Figure 2:
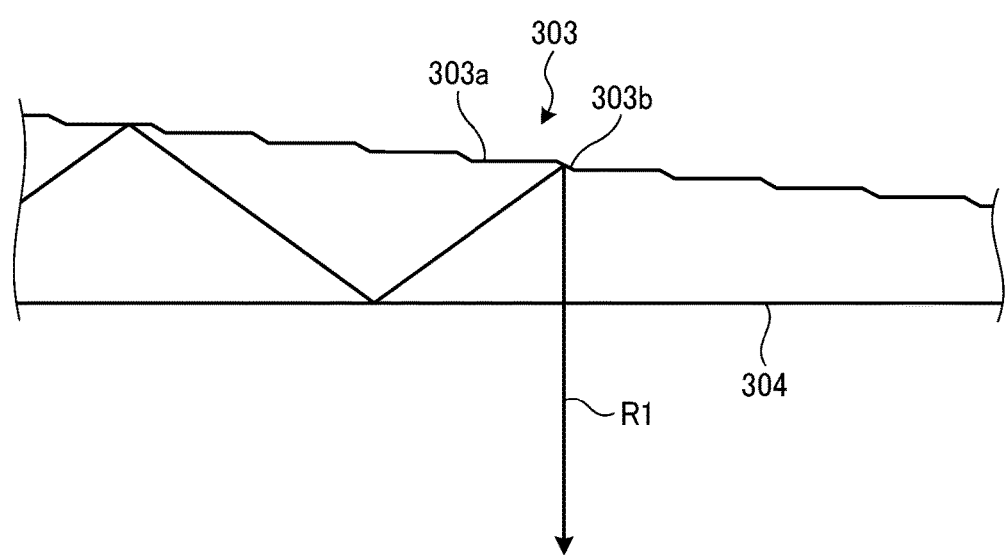
FIG. 2 is a magnified view of a part of a light guide according to the first embodiment of the present disclosure.

FIG. 2 is a magnified view of a part of the light guide 300 that includes some of the extraction unit 303, according to the present embodiment.

The extraction unit 303 includes a plurality of planes 303a that are approximately parallel to the light beam ejection unit 304 and a plurality of planes 303b that are inclined with reference to the light beam ejection unit 304. The multiple planes 303a and the multiple planes 303b are arranged in alternating sequence in the right and left directions of the drawing (i.e., the direction heading for the tip of the light guide 300 from the base end).

Once the light that is guided through the light guiding unit 302 with repeated total internal reflection hits each one of the multiple planes 303b, for example, the light is reflected toward the light beam ejection unit 304 as indicated as a light beam R1. As each one of the multiple plane 303a is arranged between each pair of the multiple planes 303b, the light can move toward the tip side of the light guide 300 until the light hits one of the multiple planes 303b. Accordingly, the light can be guided by a site of the light beam ejection unit 304 arranged on the tip side of the light guide 300. Due to such a configuration, the virtual-image display device 1000 that enables wide-angle display can be implemented using the light guide 300 that has a relatively thin shape.

In the present embodiment, the light guide 300 is configured by a pair of light guiding members including a first light guiding member 310 and a second light guiding member 320. As illustrated in FIG. 1, in the light guide 300 according to the present embodiment, the optical entrance 301, the light guiding unit 302, the extraction unit 303, the light beam ejection unit 304, and the reflector 305 are provided for the first light guiding member 310. Moreover, in the light guide 300 according to the present embodiment, the first light guiding member 310 and the second light guiding member 320 are configured by a material with an approximately equivalent refractive index, and are configured by, for example, the same material.

Figure 3:
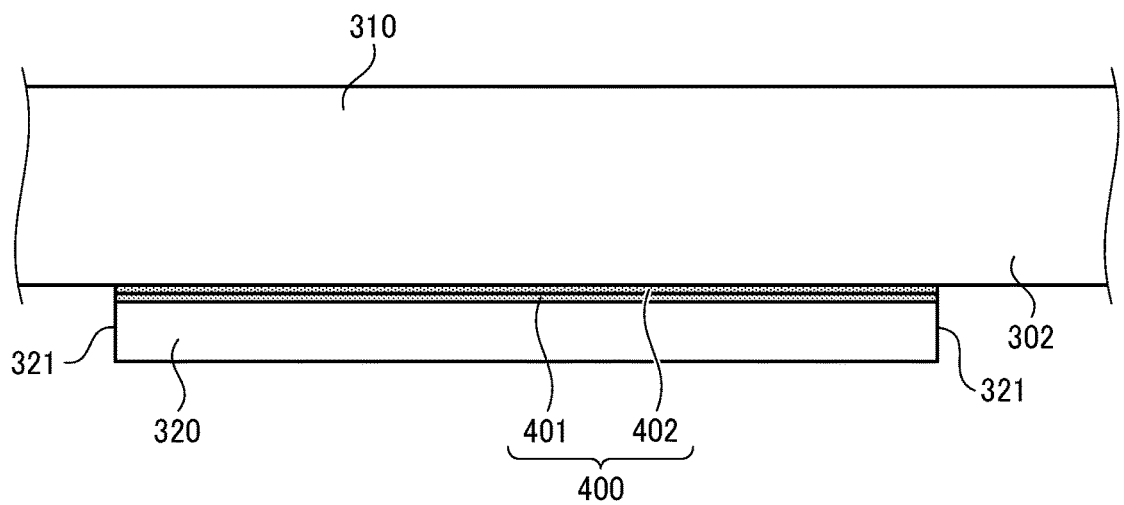
FIG. 3 is another magnified view of a part of a light guide according to the first embodiment of the present disclosure.

FIG. 3 is a magnified view of a part of the light guide 300 that includes some of the second light guiding member 320, according to the present embodiment.

As illustrated in FIG. 3, the second light guiding member 320 has a pair of edge faces 321 on the base-end side and tip side, respectively, and is shaped like a parallel plate. Moreover, the second light guiding member 320 is bonded to the light guiding unit 302 of the first light guiding member 310 having a middle layer 400 therebetween.

The middle layer 400, which is disposed at the bonding portion between the first light guiding member 310 and the second light guiding member 320, includes a reflective or transmissive film 401 and an adhesive layer 402.

The reflective or transmissive film 401 is formed on the second light guiding member 320 by means of, for example, vapor deposition. The reflective or transmissive film 401 may be, for example, a dielectric film and a metal film made of a silver (Ag) material or the like. The reflective or transmissive film 401 is a coating film that has half-mirror characteristics. The reflective or transmissive film 401 transmits some of the light that is guided through the first light guiding member 310 to the second light guiding member 320 side, and reflects the rest of the light that is guided through the first light guiding member 310 to the first light guiding member 310 side. The half-mirror characteristics of the reflective or transmissive film 401 may be characteristics close to 50% for the reflectivity and 50% for the transparency. However, no limitation is intended thereby, and the half-mirror characteristics of the reflective or transmissive film 401 may be, for example, 30% for the reflectivity and 70% for the transparency.

The adhesive layer 402 is a layer that bonds the first light guiding member 310 and the second light guiding member 320 together, and is configured by, for example, adhesive material.

Moreover, the adhesive layer 402 has a refractive index that is, for example, almost equal to that of the first light guiding member 310 and the second light guiding member 320.

In the light guide 300 according to the present embodiment as configured above, the second light guiding member 320 is shaped like a parallel plate, and is bonded at least to the light guiding unit 302 of the first light guiding member 310. Due to such a configuration, a dropout error of brightness can be controlled on a virtual image to be observed in the virtual-image display device 1000 provided with the light guide 300, and a light guide with easy production can be achieved.

Some advantageous effects of the light guide 300 according to the present embodiment are described below in comparison to a light guide 330 according to a control sample of the above embodiment of the present disclosure.

Figure 4:
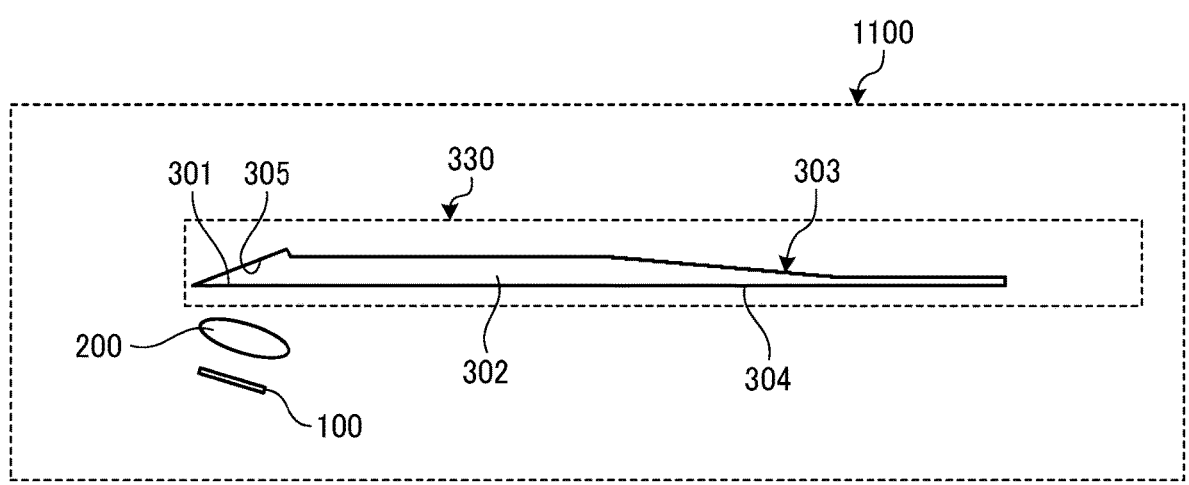
FIG. 4 is a schematic diagram illustrating a virtual-image display device provided with a light guide, according to a control sample of the above embodiment of the present disclosure.

FIG. 4 is a schematic diagram illustrating a virtual-image display device 1100 provided with a light guide 330, according to a control sample of the above embodiment of the present disclosure.

In the virtual-image display device 1100 according to the present control sample of the above embodiment of the present disclosure, the light guide 300 of the virtual-image display device 1000 is replaced with the light guide 330. The light guide 330 according to the present control sample of the above embodiment is provided with the optical entrance 301, the light guiding unit 302, the extraction unit 303, the light beam ejection unit 304, and the reflector 305. The light guide 330 according to the present control sample of the above embodiment has a shape similar to that of the first light guiding member 310 and is configured by a material similar to that of the first light guiding member 310, but is not provided with the second light guiding member 320.

Figure 5:
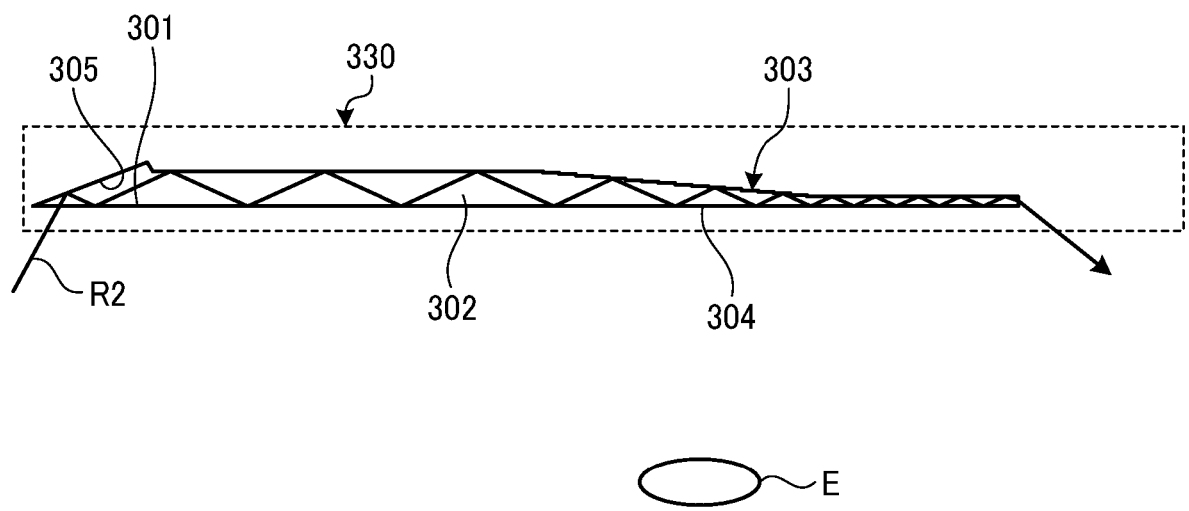
FIG. 5 is a diagram illustrating a light beam guided by a light guide, according to a control sample of the above embodiment of the present disclosure.

FIG. 5 is a diagram illustrating a light beam guided by the light guide 330 according to the present control sample of the above embodiment of the present disclosure.

A light beam R2 is a part of the image light that is emitted from a part of the image display element 100 as illustrated in FIG. 4, and is incident on a plane of the optical entrance 301 at a certain angle. As illustrated in FIG. 5, a light beam R2 is guided through the light guiding unit 302 with repeated total internal reflection. However, the light beam R2 ends up reaching the tip end of the light guide 330 without hitting any one of the multiple inclined planes 303b (see FIG. 2) inside the extraction unit 303. Such a light beam R2 does not reach an eye E of a user. As a result, a loss in the picture exists on a virtual image that the user visually recognize. In other words, a dropout error of brightness occurs on a virtual image that the user visually recognize. As a result, the image quality of a virtual image deteriorates.

Figure 6:
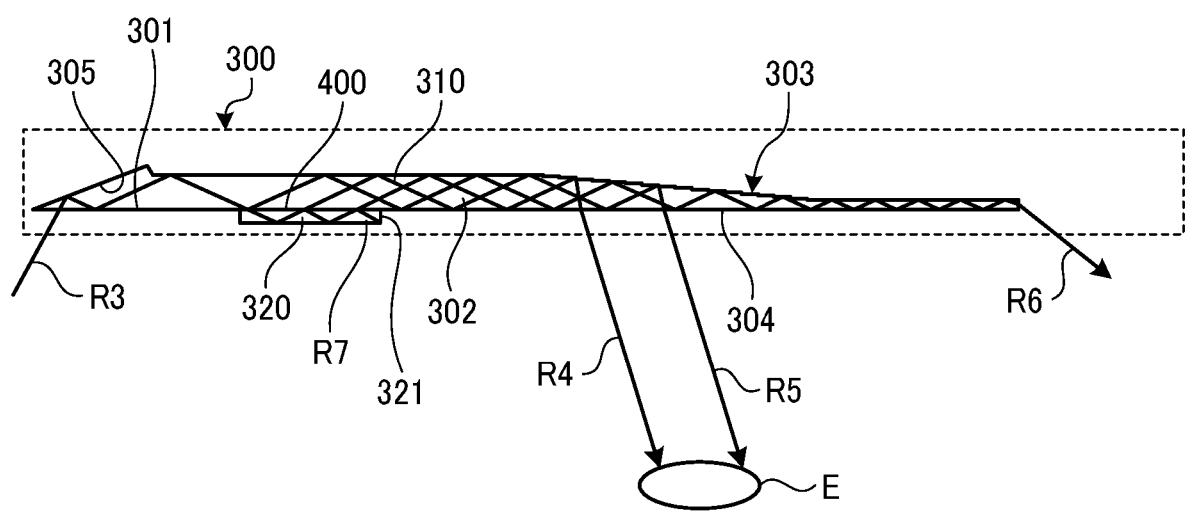
FIG. 6 is a diagram illustrating a light beam guided by a light guide, according to the first embodiment of the present disclosure.

Compared with the control sample as illustrated in FIG. 5, FIG. 6 is a diagram illustrating a light beam guided by the light guide 300 according to the first embodiment of the present disclosure.

A light beam R3 is a part of the image light that is emitted from a part of the image display element 100 as illustrated in FIG. 1, and is incident on a plane of the optical entrance 301 at the same angle as that of the light beam R2 as illustrated in FIG. 5. In this configuration, as illustrated in FIG. 6, the light beam R3 is divided into a light beam R4, a light beam R5, a light beam R6, and a light beam R7 as multiple reflection occurs due to the existence of the second light guiding member 320. As a result, the external appearance of the light flux of the light beam R3 or even the entire image light inside the light guide 300 can be expanded. Due to this configuration, for example, the light beam R6 ends up reaching the tip end of the light guide 330 without hitting any one of the multiple inclined planes 303b (see FIG. 2) inside the extraction unit 303. However, the light beam R4 and the light beam R5 are reflected by the extraction unit 303 so as to be ejected to the outside of the light guide 300 through the light beam ejection unit 304, and reach the eye E of a user. In other words, there is a high probability that the light beam R3 or even the entire image light will hit the multiple inclined planes 303b (see FIG. 2) inside the extraction unit 303. For this reason, compared with the configuration or structure according to the above control sample of the first embodiment of the present disclosure as illustrated in FIG. 5, a dropout error of brightness on a virtual image that the user visually recognize can be prevented from occurring. Accordingly, the image quality of a virtual image can be prevented from deteriorating.

In the configuration and structure as illustrated in FIG. 6, there is a light beam such as a light beam R7 that reaches an edge face 321 of the second light guiding member 320. In order to handle such a situation, the edge face 321 may be coated with a material for absorbing the light with wavelengths that correspond to an image light, or the edge face 321 may be shaped so as to eject the incident light such as the light beam R7 to the outside of the second light guiding member 320. Due to such a configuration, the reflection light that is the light beam R7 reflected by the edge face 321 is prevented from being guided through the second light guiding member 320 or the first light guiding member 310 again. As a result, unnecessary light can be prevented from being stray light and contaminating a virtual image, and deterioration in image quality can be prevented from occurring. For example, a material for absorbing a visible light may be used for the coating that absorbs the light with wavelengths that correspond to an image light. The shape that eject the incident light such as the light beam R7 to the outside of the second light guiding member 320 is achieved by, for example, the roughening and coarsening of the edge face 321.

As described above, in the light guide 300 according to the present embodiment, the second light guiding member 320 is shaped like a parallel plate, and is bonded at least to the light guiding unit 302 of the first light guiding member 310. Due to such a configuration, a dropout error of brightness can be controlled on a virtual image to be observed in the virtual-image display device 1000 provided with the light guide 300. Moreover, the second light guiding member 320 that is shaped like a parallel plate as described above can easily be produced or prepared independently from the first light guiding member 310, and the second light guiding member 320 that is shaped like a parallel plate as described above can easily be coupled to the first light guiding member 310. For this reason, the light guide 300 according to the present embodiment can easily be produced or manufactured.

As the light guide 300 according to the present of embodiment includes the reflective or transmissive film 401, the introduction or multiple reflection of an image light to the second light guiding member 320 can easily be controlled, and the external appearance of the light flux can further be expanded.

Moreover, in the light guide 300 according to the present embodiment, it is desired that the first light guiding member 310 and the second light guiding member 320 be configured by a material with an approximately equivalent refractive index. If the first light guiding member 310 and the second light guiding member 320 are configured by a material with an approximately equivalent refractive index, the displacements in angle can efficiently be controlled between the light beam that is guided through the first light guiding member 310 and the light beam that returns to the first light guiding member 310 by reflection after being guided and introduced from the first light guiding member 310 to the second light guiding member 320. As a result, a desirable virtual image can be displayed. Note also that the refractive indexes are not necessarily completely matched, and there may be some displacements in angle between the light beam that is guided through the first light guiding member 310 and the light beam that returns to the first light guiding member 310 by reflection after being guided and introduced from the first light guiding member 310 to the second light guiding member 320 as long as such displacements do not significantly affect a virtual image to be displayed.

Moreover, in the light guide 300 according to the present embodiment, the first light guiding member 310 and the second light guiding member 320 are bonded together by an adhesive layer 402 that has a refractive index that is almost equal to that of the first light guiding member 310 and the second light guiding member 320. Due to such a configuration, changes in angle can be controlled when the light beam passes through the adhesive layer 402, and a desirable virtual image can be displayed.

Moreover, in the light guide 300 according to the present embodiment, the image light that is approximately collimated is incident on the optical entrance 301, and thus there is a high probability that the image light that is emitted from the light beam ejection unit 304 will be formed at a single point on the retina of the eyes of a user. Due to such a configuration, even if the optical power of the image light is relatively weak, a desirable virtual image can be displayed.

Second Embodiment

Figure 7:
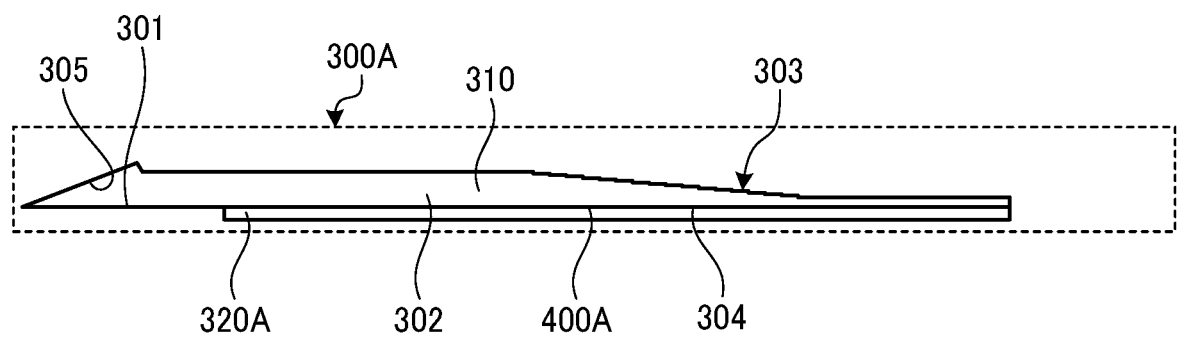
FIG. 7 is a schematic diagram illustrating a light guide according to a second embodiment of the present disclosure.

FIG. 7 is a schematic diagram illustrating a light guide 300A according to a second embodiment of the present disclosure.

The light guide 300 in the virtual-image display device 1000 as illustrated in FIG. 1 may be replaced with the light guide 300A according to the second embodiment of the present disclosure. In the light guide 300A according to the second embodiment of the present disclosure, the second light guiding member 320 and the middle layer 400 in the light guide 300 are replaced with a second light guiding member 320A and a middle layer 400A, respectively.

Figure 8:
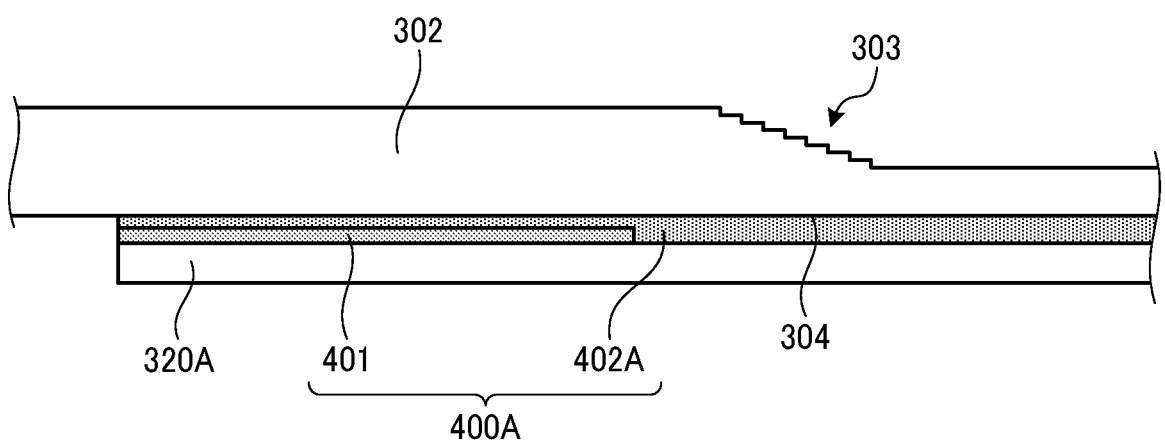
FIG. 8 is a magnified view of a part of a light guide according to the second embodiment of the present disclosure.

FIG. 8 is a magnified view of a part of the light guide 300A that includes some of the second light guiding member 320A, according to the present embodiment.

As illustrated in FIG. 7 and FIG. 8, the second light guiding member 320A is shaped like a parallel plate, and extends to a tip side of the first light guiding member 310. The reflective or transmissive film 401 of the middle layer 400A exists at a position of the light guiding unit 302 of the first light guiding member 310. However, the reflective or transmissive film 401 of the middle layer 400A does not extend to a position of the extraction unit 303 or the light beam ejection unit 304. By contrast, an adhesive layer 402A as illustrated in FIG. 8 extends to a tip side of the first light guiding member 310 and the second light guiding member 320A, and the first light guiding member 310 and the second light guiding member 320A are bonded together till the tip end.

In a similar manner to the light guide 300 according to the above embodiment of the present disclosure as described above, easy production can be achieved and a dropout error of brightness can be controlled on a virtual image to be observed also in the light guide 300A according to the present embodiment as configured above. In the light guide 300A according to the second embodiment of the present disclosure, when the curve of the second light guiding member 320A fits the curve of the light beam ejection unit 304 of the first light guiding member 310, the second light guiding member 320A and the light beam ejection unit 304 are bonded together. Due to this configuration, the curve can be reduced, and thus a desirable virtual image with little distortion can be displayed.

In the light guide 300A according to the second embodiment of the present disclosure, the reflective or transmissive film 401 does not extend to the light beam ejection unit 304. Due to such a configuration, the light that is reflected by the reflective or transmissive film 401 can be prevent from hitting the extraction unit 303 and causing undesired light such as stray light. Due to this configuration, reduction in image quality of a virtual image can be controlled.

Figure 9:
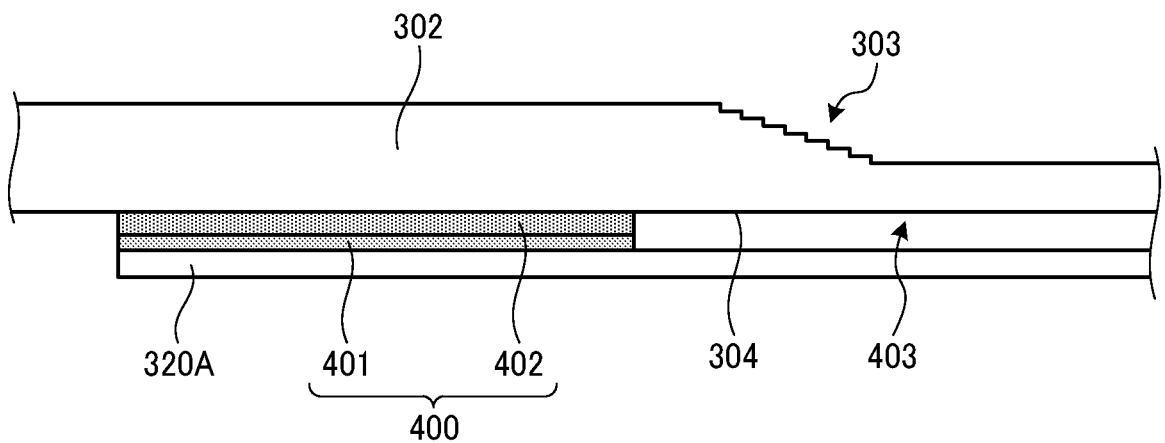
FIG. 9 is a magnified view of a part of a light guide according to a modification of the second embodiment of the present disclosure.

FIG. 9 is a magnified view of a part of a light guide according to a modification of the second embodiment of the present disclosure.

In the light guide according to the present modification of the second embodiment of the present disclosure, the adhesive layer 402 of the middle layer 400 does not extend to a tip side of the first light guiding member 310 and the second light guiding member 320A, and airspace 403 exists between the first light guiding member 310 and the second light guiding member 320A at a position of the extraction unit 303 and the light beam ejection unit 304 and at a position closer to the tip side than the extraction unit 303 and the light beam ejection unit 304.

Figure 10:
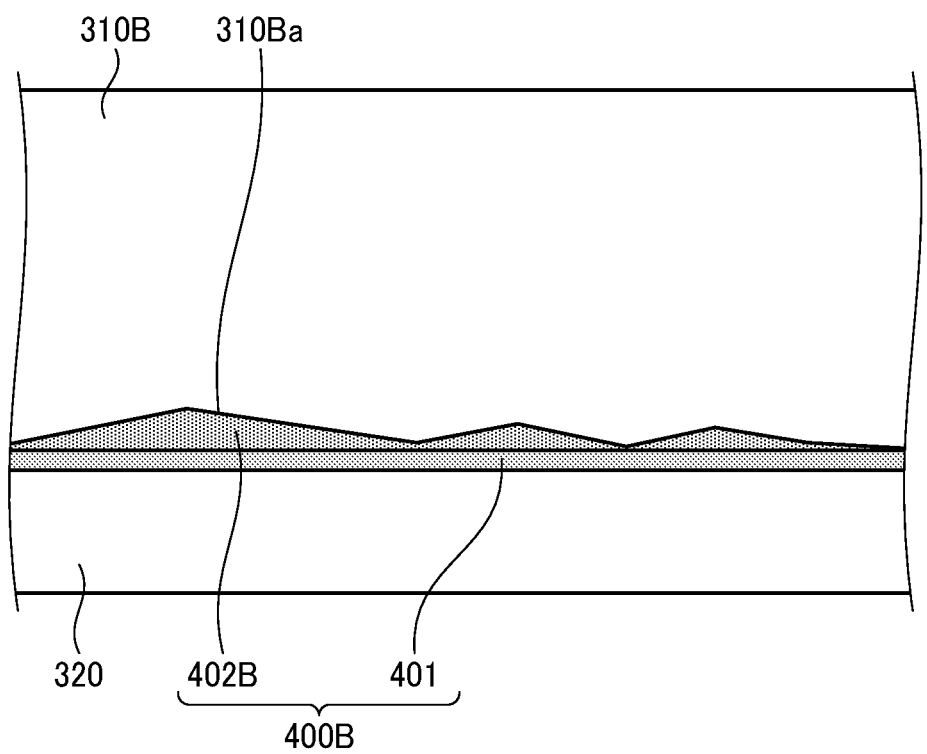
FIG. 10 is a diagram illustrating another configuration or structure of a first light guiding member as illustrated in FIG. 7.

FIG. 10 is a diagram illustrating another configuration or structure of the first light guiding member 310, according to the present embodiment.

Such a first light guiding member 310B, which has a configuration or structure different from the first light guiding member 310, has a plane 310Ba bonded together with the second light guiding member 320, and the plane 310B a has low flatness due to, for example, a manufacturing error or production error. However, a middle layer 400B includes the reflective or transmissive film 401 and an adhesive layer 402B in the present embodiment, and the adhesive layer 402B has a refractive index that is, for example, almost equal to that of the first light guiding member 310B. Due to such a configuration, the compatibility or integrity in refractive index between the first light guiding member 310B and the second light guiding member 320 is maintained in spite of the low flatness of the plane 310Ba, and a virtual image with desirable image quality can be obtained.

Figure 11A:
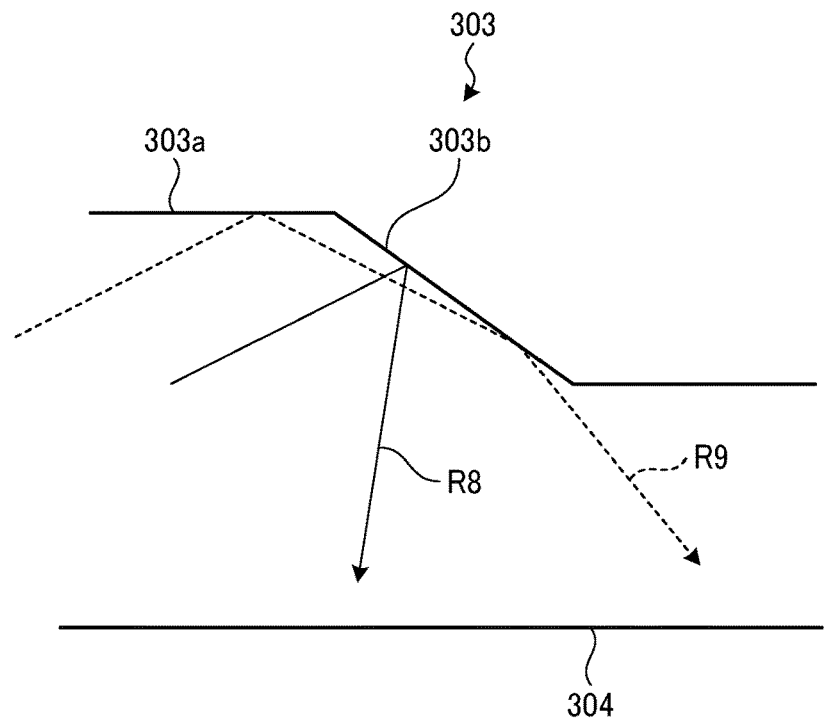
FIG. 11A and FIG. 11B are diagrams each illustrating another configuration or structure of the extraction unit as illustrated in FIG. 7.
Figure 11B:
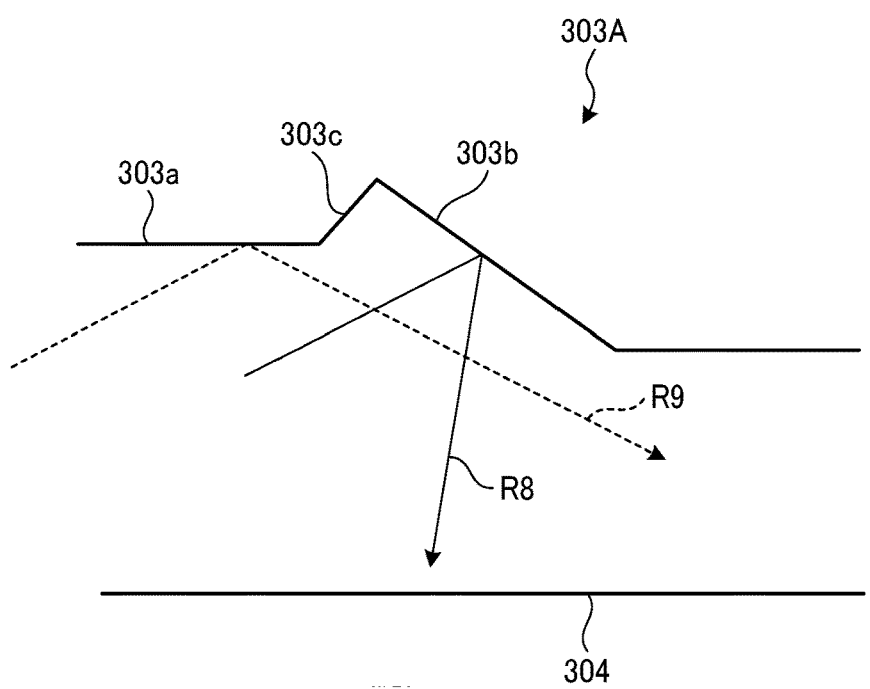

FIG. 11A and FIG. 11B are diagrams each illustrating another configuration or structure of the extraction unit 303, according to the present embodiment.

More specifically, FIG. 11A and FIG. 11B are diagrams each illustrating another configuration or structure of the extraction unit 303 that includes the plane 303*a* and the plane 303*b* as illustrated in FIG. 2. FIG. 11B is a diagram illustrating a configuration or structure of an extraction unit 303A that has a configuration or structure different from that of the extraction unit 303, according to the present embodiment. The extraction unit 303A has the multiple planes 303*a* that are approximately parallel to the light beam ejection unit 304, the multiple planes 303*b* that are inclined with reference to the light beam ejection unit 304, and a plurality of planes 303*c* that are inclined with reference to the light beam ejection unit 304. The multiple planes 303*b* and the multiple planes 303*c* are orthogonal to the multiple planes 303*a*, and are inclined with reference to a plane that extends in the depth direction of the drawing, in directions that differ from one another. The multiple planes 303*a*, the multiple planes 303*c*, and the multiple planes 303*b* are arranged in alternating sequence in the right and left directions of the drawing.

When the extraction unit 303 is adopted as in the present embodiment, a light beam R9 may exist that is reflected by the plane 303*a* and then is further reflected by the plane 303*b* and travels toward the light beam ejection unit 304, in addition to a light beam R8 that is reflected by the plane 303*b* and travels toward the light beam ejection unit 304. Such a light beam R9 may serve as a stray light for the virtual image to be observed.

By contrast, when the extraction unit 303A as illustrated in FIG. 11B is adopted, the light beam R9 does not hit the plane 303*b* after reflected by the plane 303*a*. This is because, due to the existence of the plane 303*c*, the next plane 303*a* is arranged at a position where none of the light beam R9 reach. Accordingly, it is unlikely that the light beam R9 serve as a stray light for the virtual image to be observed, and the image quality of a virtual image can be prevented from deteriorating.

Third Embodiment

Figure 12:
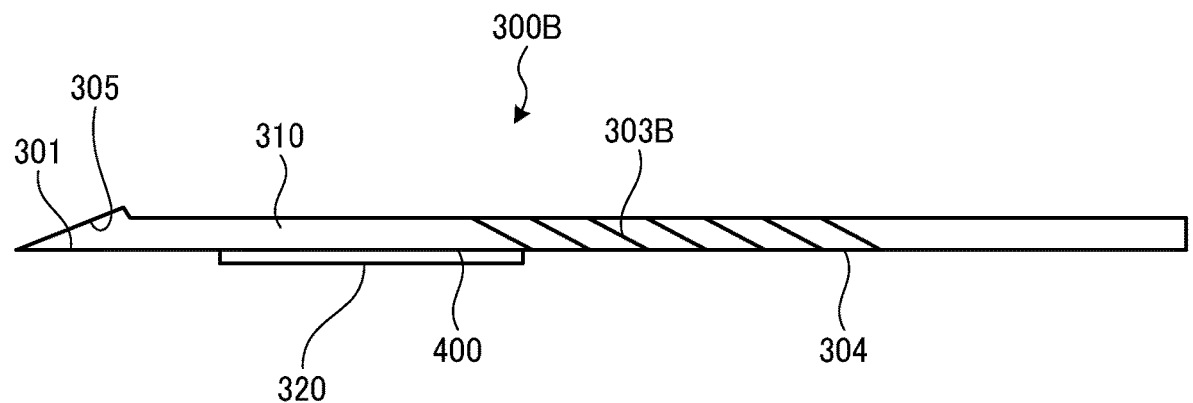
FIG. 12 is a schematic diagram illustrating a light guide according to a third embodiment of the present disclosure.

FIG. 12 is a schematic diagram illustrating a light guide 300B according to a third embodiment of the present disclosure.

The light guide 300 in the virtual-image display device 1000 as illustrated in FIG. 1 may be replaced with the light guide 300B according to the third embodiment of the present disclosure. In the light guide 300B according to the second embodiment of the present disclosure, the extraction unit 303 of the light guide 300 is replaced with an extraction unit 303B.

The extraction unit 303B is configured by a large number of mirrors that area arranged inside the first light guiding member 310 and coated with a material of a specific reflectance ratio. In a similar manner to the light guide 300 according to the above embodiment of the present disclosure as described above, easy production can be achieved and a dropout error of brightness can be controlled on a virtual image to be observed also in the light guide 300B according to the present embodiment as configured above.

Fourth Embodiment

Figure 13:
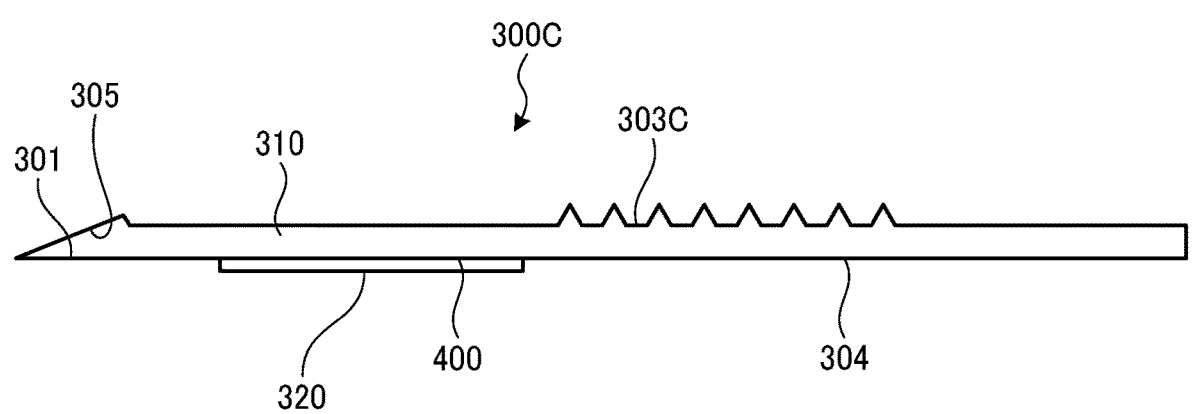
FIG. 13 is a schematic diagram illustrating a light guide according to a fourth embodiment of the present disclosure.

FIG. 13 is a schematic diagram illustrating a light guide 300C according to a fourth embodiment of the present disclosure.

The light guide 300 in the virtual-image display device 1000 as illustrated in FIG. 1 may be replaced with the light guide 300C according to the fourth embodiment of the present disclosure.

In the light guide 300C according to the fourth embodiment of the present disclosure, the extraction unit 303 of the light guide 300 is replaced with an extraction unit 303C.

The extraction unit 303C is provided with micro parts and gap zones on the plane on the other side of the light beam ejection unit 304 of the first light guiding member 310. In a similar manner to the light guide 300 according to the above embodiment of the present disclosure as described above, easy production can be achieved and a dropout error of brightness can be controlled on a virtual image to be observed also in the light guide 300C according to the present embodiment as configured above.

Example and Control Sample

As an example of the present disclosure, a result of simulating the brightness distribution of a virtual image under the following conditions in the virtual-image display device according to the first embodiment of the present disclosure as illustrated in FIG. 1 is given below. As a control sample of the above embodiment of the present disclosure, a result of simulating the brightness distribution of a virtual image under the following conditions in the virtual-image display device as illustrated in FIG. 4 is given below. Note that the second light guiding member 320 does not exist in the above control sample and that condition is not taken into consideration.

Conditions

Image display element 100
Display area: 5.28 millimeters (mm)×2.97 mm
Optical system 200
Angle of visibility (opposite angle): 40 degrees
Focal length: 6.8 mm
F-number (FNO.): 5.8
Second light guiding member 320
Material: Polymethyl methacrylate (PMMA)
Size: 15 mm×21 mm
Thickness: 0.7 mm
First light guiding member 310
Material: Polymethyl methacrylate (PMMA)
Thickness: 0.5 mm at the thinnest portion; and 2.0 mm at the thickest portion
Length: 59 mm
Width: 50 mm
Extraction unit 303
Width of Plane 303b: 0.2 mm
Angle with reference to Light beam ejection unit 304: 27 degrees
Width of Plane 303a: 0.76 mm
Eye box: Equal to or wider than 5 mm
Eye relief: Equal to or wider than 15 mm FIG. 14 is a diagram illustrating a result of simulating the brightness distribution of a virtual image in a virtual-image display device according to a control sample of the above embodiments of the present disclosure.

Figure 15:
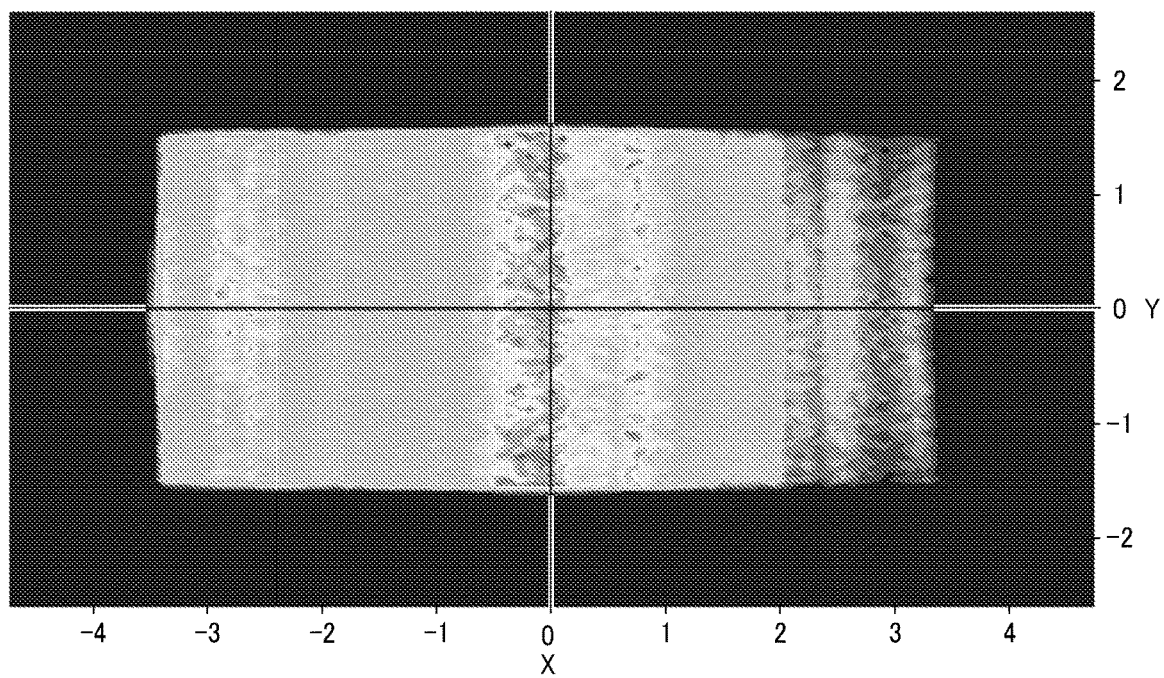
FIG. 15 is a diagram illustrating a result of simulating the brightness distribution of a virtual image in a virtual-image display device according to an embodiment of the present disclosure.

FIG. 15 is a diagram illustrating a result of simulating the brightness distribution of a virtual image in the virtual-image display device 1000 according to the above embodiment of the present disclosure.

Figure 14:
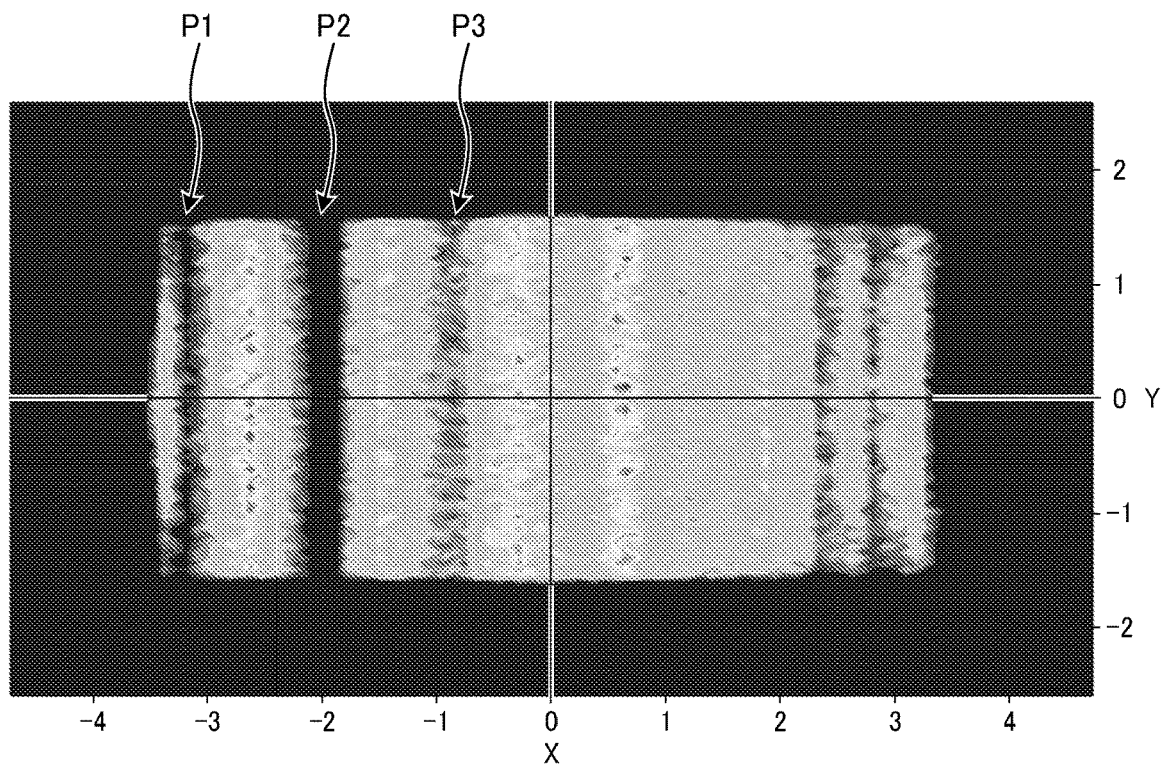
FIG. 14 is a diagram illustrating a result of simulating the brightness distribution of a virtual image in a virtual-image display device according to a control sample of the above embodiment of the present disclosure.

In FIG. 14 and FIG. 15, the X-direction indicates the longer-side directions of the light guide (the right and left directions in FIG. 1 and FIG. 4), and the Y-direction indicates the width directions of the light guide (the depth directions in FIG. 1 and FIG. 4). The values in the X-direction and Y-direction indicate a relative position, and zero indicates the center.

In the control sample as illustrated in FIG. 14, significant dropouts where the brightness is close to zero exist at positions P1, P2, and P3 that are separated from each other in the X-direction. However, no such significant dropout where the brightness is close to zero exists in the result of simulation as illustrated in FIG. 15 according to the above embodiment of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, the optical system 200 may be configured to generate an approximately collimated beam after an intermediate image of an image light that is emitted from the image display element 100 is formed. In such a configuration, the approximately collimated beam is incident on the light guide 300. As the optical system 200 is configured to form an intermediate image beforehand, the image display element 100 whose weight percentage is relatively high in the virtual-image display device 1000 can be arranged on the rear side in a direction apart from the light guide 300. Due to this configuration, when the virtual-image display device 1000 is configured like glasses, the weight on the front side can be reduced, and a comfortable virtual-image display device shaped like glasses, which is also referred to as a smart glass, can be achieved.

In the above embodiments of the present disclosure, a light guide is configured by two light guiding members such as the first light guiding member 310 and the second light guiding member 320. However, no limitation is indicated thereby, and a light guide may be configured by two or more light guiding members in some embodiments.

The second light guiding member 320 is bonded to the principal plane of the light guiding unit 302 that is arranged on the same side of the light beam ejection unit 304 in the first light guiding member 310. However, no limitation is indicated thereby, and the second light guiding member 320 may be bonded to the principal plane of the light guiding unit 302 that is arranged on the same side of the extraction unit 303.

The reflective or transmissive film 401 is not limited to the reflective or transmissive film that is formed on the second light guiding member 320, but may be formed on the first light guiding member 310 by means of, for example, vapor deposition.

Note also that the configuration or structure of the light guide or the virtual-image display device as described above is applicable even if the right and left in the drawing is reversed. The virtual-image display device according to the above embodiments of the present disclosure may be configured such that a single light guide is observed by both eyes of a user, or may be configured such that a pair of light guides are observed by a pair of eyes, respectively. Alternatively, the virtual-image display device according to the above embodiments of the present disclosure may be configured to be small such that a single light guide is observed by a single eye. Due to the configurations and structure as described above, a light smart glass that is free from a dropout error of brightness even when a virtual image with a wide angle equal to or wider than, for example, 30 degrees is to be displayed can be achieved. The virtual-image display device according to the above embodiments of the present disclosure may be configured as a heads-up display (HUD).

A light guide embodiments of the present disclosure and a virtual-image display device provided with the light guide are described below with reference to the drawings.

The light guide according to an embodiment of the present disclosure includes an optical entrance through which the light is taken into the inside of the light guide, a light guiding unit that guides the light by internal reflection, and a light beam ejection unit through which the light guided by the light guiding unit ejects. The light guiding unit includes a first reflection plane and a second reflection plane that face each other and are approximately parallel to each other. The light that is taken into the inside of the light guiding unit is guided within the light guiding unit from an optical entrance side toward a light beam ejection unit with alternate total internal reflection between the first reflection plane and the second reflection plane.

The second reflection plane is configured by a plurality of image extraction units and a plurality of sub-reflection planes that are arranged in alternating sequence on the rear side in the light-guiding direction. The multiple image extraction units are inclined in a downward direction toward the light beam ejection unit, so as to extract the light to the outside of the light guide through the light beam ejection unit. Each one of the multiple sub-reflection planes is formed subsequent to one of the multiple image extraction units so as to be approximately parallel to the first reflection plane. A plurality of image extraction units and a plurality of sub-reflection planes (33, 133) are alternately arranged.

There is at least one optical-path separator between the first reflection plane and the second reflection plane. The optical-path separator is approximately parallel to the first reflection plane and the second reflection plane. The optical-path separator exists at some area between the first reflection plane and the second reflection plane, and the optical-path separator does not exist at the other area between the first reflection plane and the second reflection plane. The optical-path separator serves as a boundary surface that totally reflects the light depending on the angle of incidence of the light, and that transmits the light when the angle of incidence of the light falls within a predetermined range.

Light beams with a wide reflection angle and light beams with a narrow reflection angle with reference to a normal line to the second reflection plane are included in the light that is taken into the light guide through the optical entrance. Assuming that the wavelength of the light is constant, the optical-path separator with the boundary surface as described above totally reflects the light when the reflection angle by the second reflection plane is wide and the angle of incidence is wider than a critical angle of the optical-path separator. On the other hand, the optical-path separator with the boundary surface as described above transmits the light when the reflection angle by the second reflection plane is narrow and the angle of incidence is narrower than a critical angle of the optical-path separator.

The optical-path separator may be a single unit, or may consist of a plurality of units that are arranged at prescribed intervals in the light-guiding direction. In both cases, the optical-path separator is detached from the optical entrance, and transmits or totally reflects the light reflected by the second reflection plane, depending on whether the incident angle is less than or equal to or greater than the critical angle that serves as a boundary.

The light that is reflected by the second reflection plane and passes through the boundary surface of at least one optical-path separator and travels to the first reflection plane is referred to as the first light. The light that is reflected by the second reflection plane and then reflected by the boundary surface of at least one optical-path separator and travels to the second reflection plane is referred to as the second light. In other words, the first light is a light where at least one incident angle with reference to a normal line to the above boundary surface has an incident angle narrower than the critical angle for the above boundary surface, and the second light is a light where at least one incident angle with reference to a normal line to the above boundary surface has an incident angle equal to or wider than the critical angle.

There is an area with no boundary surface between the optical entrance and the area that includes at least one boundary surface, and in such an area with no boundary surface, the second light travels within the light guide with total internal reflection between the second reflection plane and the boundary surface. Due to the provision of the above boundary surface, the intervals at which the second light of incident lights with varying angles of view that have approximately been collimated is totally reflected by the second reflection plane can be shortened, and the second reflection plane can be irradiated with light beams with varying angles of view with even light intensity.

Among light beams with varying angles of view that are approximately collimated and incident on the optical entrance, the intervals at which the first light is totally reflected by the second reflection plane are narrower than the intervals at which the second light is totally reflected when there is no boundary surface in the first place. Due to this configuration, the second reflection plane can be irradiated with light beams that have varying angles of view with even light intensity.

As described above, in the planar light guide where the multiple image extraction units are arranged on the plane on the other side of the plane through which a virtual image is to be observed, the optical-path separator is disposed between the first reflection plane and the second reflection plane. Due to such a configuration, light beams with reduced unevenness in brightness and a reduced dropout error of brightness can be taken out and obtained.

Fifth Embodiment

Figure 16:
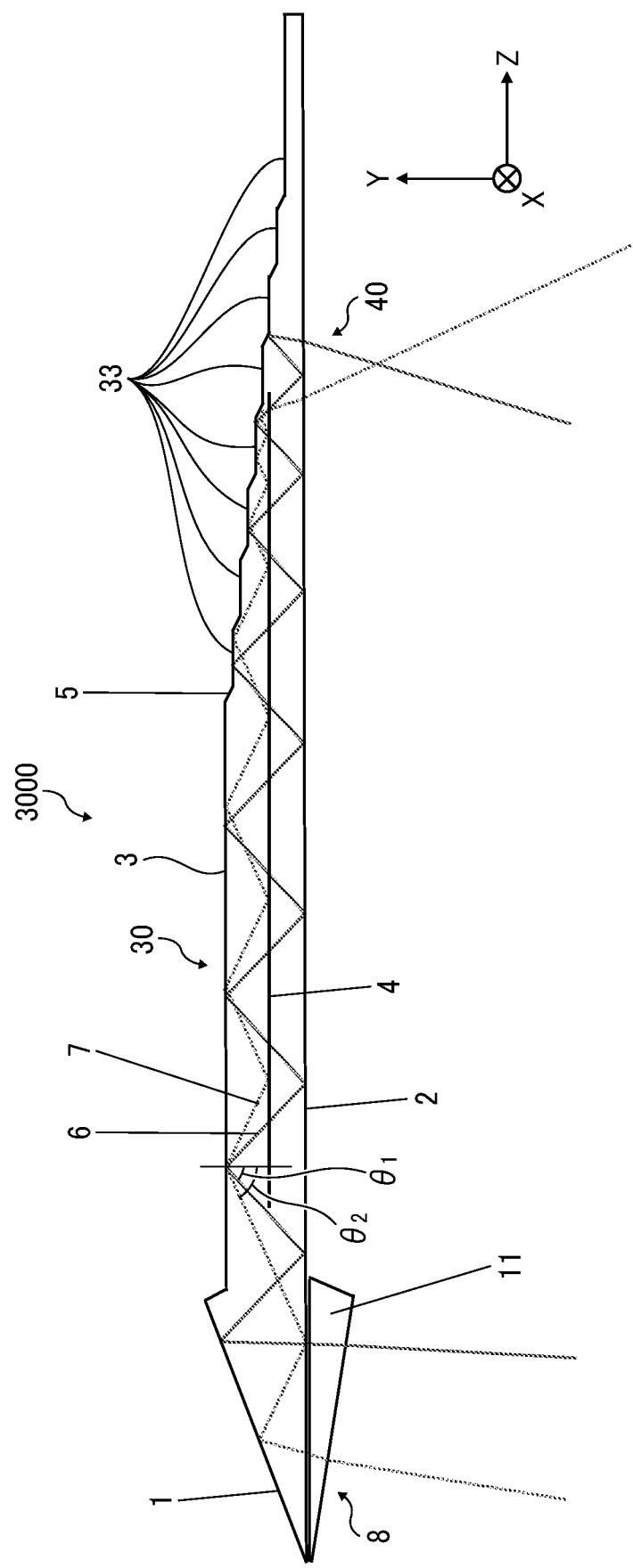
FIG. 16 is a plan view of a light guide according to a fifth embodiment of the present disclosure.

FIG. 16 is a schematic diagram illustrating a light guide 3000 according to a fifth embodiment of the present disclosure.

As illustrated in FIG. 16, the light guide 3000 according to the fifth embodiment of the present disclosure is a plate-like component made of a transparent material such as a glass or plastic. The light guide 3000 may be referred to as a planer light guide plate. The light guide 3000 according to the present embodiment is provided with an optical entrance 8, a light guiding unit 30, and a light beam ejection unit 40.

The optical entrance 8 is provided with a wedge-shaped prism 11 on the plane on which the light that is incident, and a mirror 1 is arranged on the other side of the plane on which the prism 11 is disposed. The light is incident on the bottom face of the prism 11 at right angles. The prism 11 is a polyhedron made of a transparent material such as a glass or crystal. The mirror 1 totally reflects the light that has passed through the prism 11 so as to guide the light to the light guiding unit 30.

The light guiding unit 30 according to the present embodiment guides the incident light that enters through the optical entrance 8 to the light beam ejection unit 40. Moreover, the light guiding unit 30 according to the present embodiment includes a first reflection plane 2, a second reflection plane 3, and an optical-path separator 4. The first reflection plane 2 reflects the light that is reflected by the mirror 1 toward the second reflection plane 3. The second reflection plane 3 reflects the light that is reflected by the first reflection plane 2 toward the first reflection plane 2. The optical-path separator 4 is a thin film made of a material with a low refractive index such as aluminum fluoride ($AlF_3$) and sodium fluoride (NaF), and the light guide 3000 is formed by a material with a high refractive index such as a plastic material. The optical-path separator 4 is a member that transmits the light of the first reflection angle $\theta_1$ that is reflected by the second reflection plane 3, and that reflects the light of the second reflection angle $\theta_2$ that is reflected by the second reflection plane 3.

The second reflection plane 3 includes a plurality of image extraction units 5 and a plurality of sub-reflection planes 33. The second reflection plane 3 has a part subsequent to a specific position, where a plurality of oblique faces and a plurality of flat faces are alternately arranged, and such a plurality of oblique faces of the second reflection plane 3 are referred to as the image extraction units 5. The multiple flat faces of the second reflection plane 3 after the first oblique face of the multiple image extraction units 5 are referred to as the sub-reflection planes 33.

A first light wave 6 belongs to a group of light beams with varying angles of view that are incident on the optical-path separator 4 with an angle of incidence smaller than a critical angle of optical-path separator 4. A second light wave 7 belongs to a group of light beams with varying angles of view that are incident on the optical-path separator 4 with an angle of incidence equal to or greater than a critical angle of optical-path separator 4.

The optical-path separator 4 may include a plurality of planes. When the optical-path separator 4 has a plurality of planes, the first light wave 6 and the second light wave 7 are defined with reference to a plurality of light beams that are approximately collimated and are incident on the multiple planes of optical-path separator 4 with several angles of view.

The first reflection angle $\theta_1$ is the angle at which the first light wave 6 is reflected with reference to a normal line to the second reflection plane 3. The second reflection angle $\theta_2$ is the angle at which the second light wave 7 is reflected with reference to a normal line to the second reflection plane 3.

In the present embodiment, the triaxial directions that includes the X-direction, the Y-direction, and the Z-direction are defined in a similar manner to the control sample of the above embodiment of the present disclosure as described above with reference to FIG. 40.

Regarding the Y-axis direction, the direction toward the light beam ejection unit 40 when viewed from the position of an eye is referred to as the normal (positive) direction, and the direction from the front side toward the position of the eye is referred to as the negative direction. Regarding the Z-axis direction, the light-guiding direction, i.e., the direction of travel from the left side of the right side as illustrated in FIG. 16, is referred to as the normal (positive) direction.

The light that is reflected by the multiple image extraction units 5 exits from the light beam ejection unit 40 of the first reflection plane 2 in the negative direction of the Y-axis as illustrated in FIG. 16. The light beam ejection unit 40 includes the multiple image extraction units 5 and a plurality of sub-reflection planes 33. Each one of the multiple image extraction units 5 undergoes, for example, aluminum vapor deposition and dielectric multilayer vapor deposition, and serves as a mirror. The multiple image extraction units 5 are arranged at a plurality of positions, and divide the second reflection plane 3 into a plurality of segments or areas. Each one of the multiple image extraction units 5 couples the second reflection plane 3 to one of the sub-reflection planes 33, and couples each pair of the sub-reflection planes 33. Each one of the multiple image extraction units 5 is inclined with reference to the second reflection plane 3 at an obtuse angle.

The multiple image extraction units 5 that are inclined at an obtuse angle and the second reflection plane 3 configure a part of the multiple sub-reflection planes 33. The multiple image extraction units 5 and the multiple sub-reflection planes 33 are alternately linked to each other, and the size of the space between the multiple sub-reflection planes 33 and the first reflection plane 2 gets narrower toward the light-guiding direction (i.e., the positive Z-direction in FIG. 16).

In the present embodiment, the light that has approximately been collimated is emitted toward the light guide 3000. The light beam that corresponds to the pixel of the center of an image is incident on the bottom face of the prism 11 at right angles, and enters the light guide 3000 that is a planer light guide plate. The incident light is reflected by the mirror 1 that is integrated with the light guide 3000, and travels toward the first reflection plane 2. The first reflection plane 2 totally reflects the light at the same angle as the incident angle.

The light beams with varying wavelengths that are totally reflected by the first reflection plane 2 is emitted toward the second reflection plane 3. After that, the light beams with varying wavelengths that are approximately collimated travel toward the light beam ejection unit 40 through the light guide 3000 with repeated incidence and reflection between the first reflection plane 2 and the second reflection plane 3. The first reflection plane 2 and the second reflection plane 3 are approximately parallel to each other, and the amount of misalignment with reference to being parallel with each other need to be equal to or less than $\pm 1°$.

In the present embodiment, the optical-path separator 4 is disposed between the first reflection plane 2 and the second reflection plane 3. The optical-path separator 4 totally reflects or transmits the light depending on whether the incident angle is greater or narrower than a predetermined critical angle. In other words, optical-path separator 4 totally reflects the light whose incident angle is wider than a critical angle, and transmits the light whose incident angle is narrower than the critical angle.

In the present embodiment, the first light wave 6 and the second light wave 7 are respectively defined as follows. The light wave that travels toward the first reflection plane 2 from the position at which the light is totally reflected first by the second reflection plane 3 and then is totally reflected by optical-path separator 4 and travels toward the second reflection plane 3 is referred to as a second light wave 7 in the following description. The light wave that is totally reflected first by the second reflection plane 3 and then passes through the optical-path separator 4 and travels toward the first reflection plane 2 is referred to as a first light wave 6 in the following description. The second light wave 7 is guided between the second reflection plane 3 and the optical-path separators 4 with repeated total internal reflection, and the first light wave 6 is guided through the space between the first reflection plane 2 and the second reflection plane 3 with repeated total internal reflection.

As described above, the first light wave 6 does not meet the conditions for total reflection and thus passes through the optical-path separator 4. By contrast, the second light wave 7 meets the conditions for total reflection and thus is totally reflected by optical-path separator 4. The multiple image extraction units 5 are irradiated with the first light wave 6 and the second light wave 7 that are guided through the light guide 3000. Then, the first light wave 6 and the second light wave 7 are reflected at an angle different from the total-reflection angle by the first reflection plane 2 and the second reflection plane 3, and are ejected to the outside of the light guide 3000 through the light beam ejection unit 40. By observing the ejected light with eyes, the image that is formed by the image forming element can be observed.

In the light guide 3000 according to the above embodiment of the present disclosure as described above, the optical-path separator 4 that separates the incident light into the light to be totally reflected and the light to be transmitted depending on the reflection angle of the light by the second reflection plane 3 is provided between the first reflection plane 2 and the second reflection plane 3. With the light guide with such a configuration as described above according to the above embodiment of the present disclosure, light beams with reduced unevenness in brightness and a reduced dropout error of brightness can be taken out and obtained.

Figure 17:
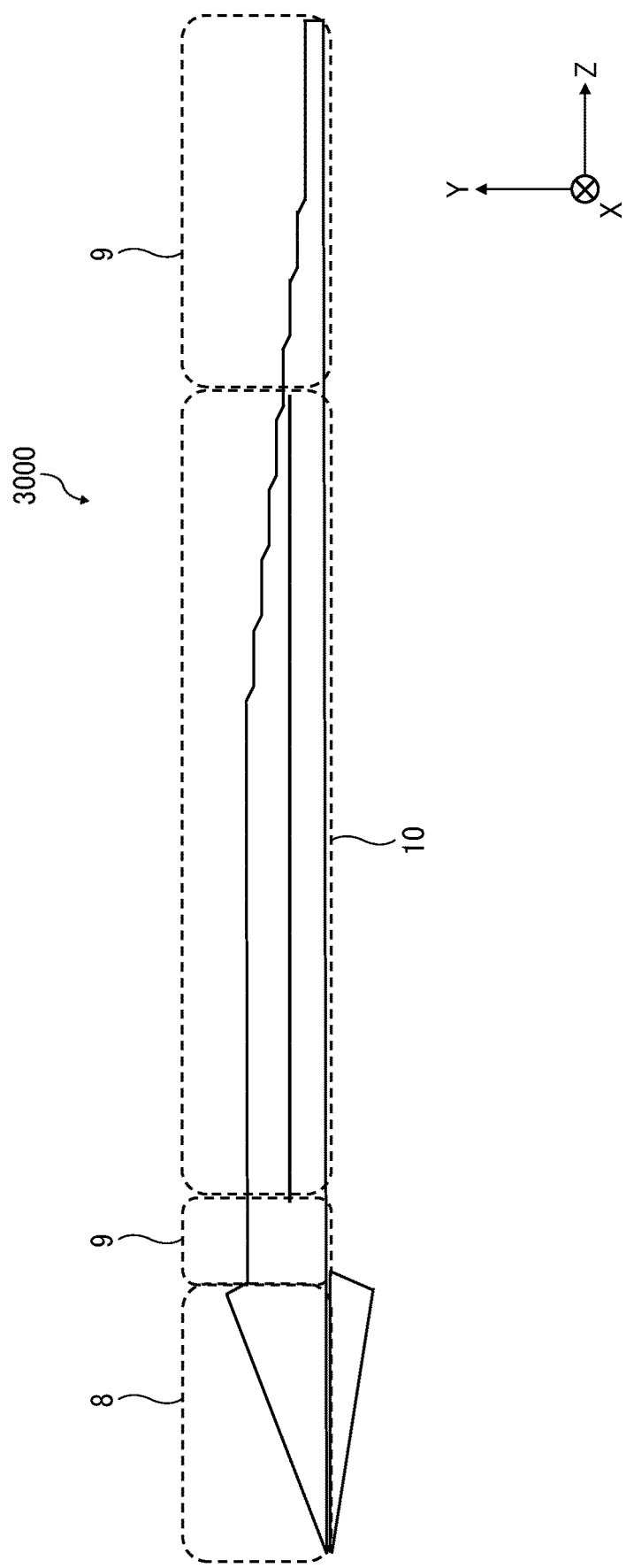
FIG. 17 is a plan view of a light guide that is classified into several functional areas, according to a fifth embodiment of the present disclosure.

FIG. 17 is a diagram illustrating the light guide 3000 of FIG. 16 that is divided into several functional areas, according the present embodiment.

As illustrated in FIG. 17, the optical entrance 8 is a functional area that converts the light that is approximately collimated and is incident on the planer light guide plate into light beams with angles suitable for being guided through the light guide 3000. An optical-path not-separating region 9 is a functional area where at least one optical-path separator 4 does not exist between the first reflection plane 2 and the second reflection plane 3. In the present embodiment as illustrated in FIG. 16, one optical-path separator 4 exists, and a pair of optical-path not-separating regions 9 exist on both right and left sides of optical-path separator 4.

The optical-path not-separating region 9 that exists between the optical entrance 8 and the optical-path separation region 10 is a functional area to irradiate an area of the second reflection plane 3 that totally reflects the light for the first time with the light that is totally reflected first by the first reflection plane 2. In the absence of the pair of optical-path not-separating regions 9, the second light wave 7 is totally reflected first by the first reflection plane 2, and then is totally reflected by optical-path separator 4 and is guided and travels forward between the first reflection plane 2 and the optical-path separators 4 with repeated total internal reflection. However, there is a problem that the multiple image extraction units 5 to be irradiated with light are not irradiated with the second light wave 7 and the light cannot be taken out at a desired position.

For example, the above problem may be solved by dividing the first reflection plane 2 into several sections and arranging a diffraction grating between each pair of the divided sections of the first reflection plane 2 as one of the image extraction units 5. However, the diffraction angle of each diffraction grating differs depending on the wavelength. For this reason, there is a problem that, for example, the wavelength of the transmission light may disperse or color irregularities or mottling may occur on a virtual image. In the above embodiment of the present disclosure, a problem that, for example, the wavelength of the transmission light may disperse or color irregularities or mottling may occur on a virtual image is solved by dividing the second reflection plane 3 into several sections and arranging a mirror between each pair of the divided sections of the second reflection plane 3 as one of the image extraction units 5 such that the light will be extracted.

The optical-path separation region 10 includes at least one boundary surface between the first reflection plane 2 and the second reflection plane 3. The optical-path separation region 10 guides the light with a relatively wide total-reflection angle such as the second light wave 7 between the second reflection plane 3 and the optical-path separator 4 with repeated total internal reflection. Due to such a configuration, the intervals at which total internal reflection is performed is shortened, and the area of the second reflection plane 3 that is not irradiated with any light wave is reduced. As a result, desired lights can be taken out and obtained from the multiple image extraction units 5.

In the optical-path not-separating region 9 that is adjacent to the optical-path separation region 10 in the positive axial direction of the Z-axis, light beams with a relatively narrow total-reflection angle such as the first light wave 6 is taken out from the multiple image extraction units 5. For this reason, no boundary surface is necessary by optical-path separator 4.

Figure 38:
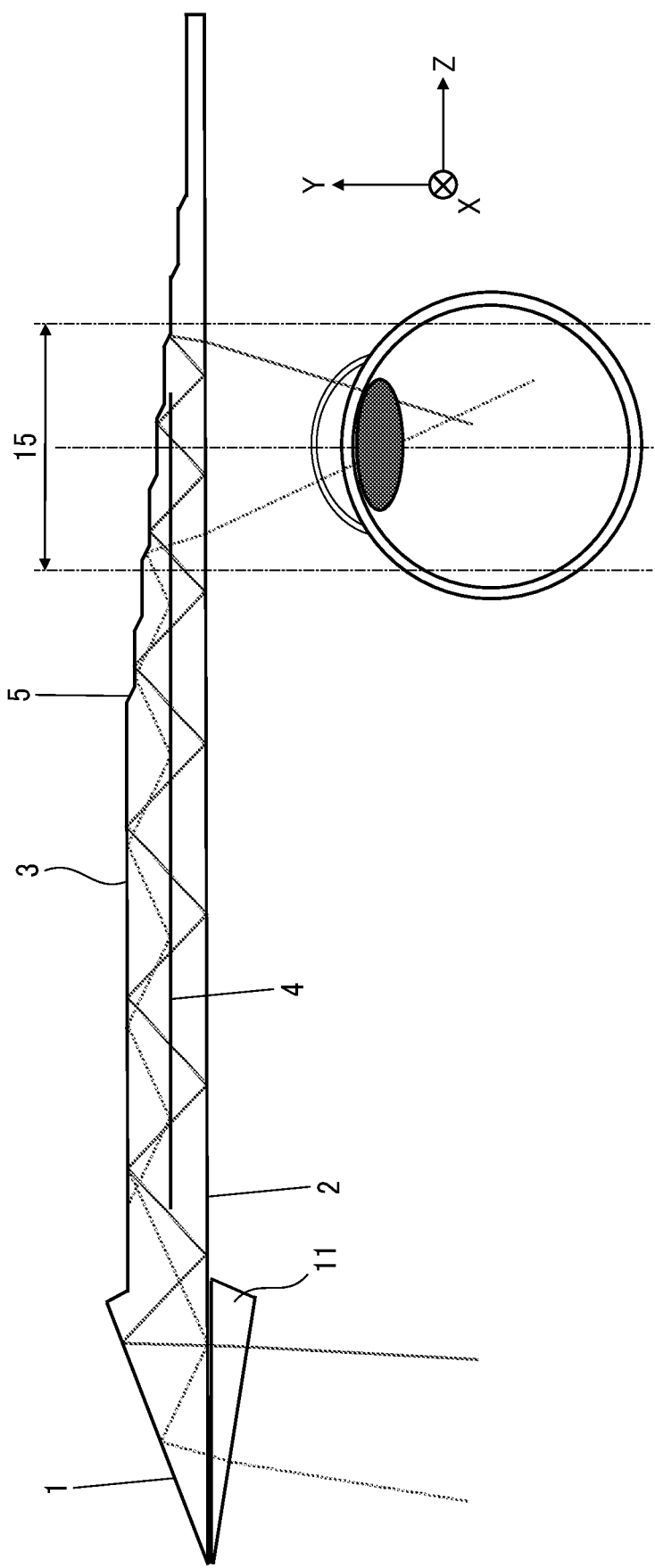
FIG. 38 is a plan view of a light guide, illustrating how an image is observed as a virtual image, according to the sixth embodiment of the present disclosure.

FIG. 38 is a diagram illustrating how the first light wave 6 and the second light wave 7 reach the eye box 15 in the light guide 3000, according to the present embodiment.

The description or the like of each element or member of the light guide 3000 is omitted as the configuration or structure of these drawings is equivalent to that of FIG. 16 according to the fifth embodiment of the present disclosure. As illustrated in FIG. 38, both the first light wave 6 and the second light wave 7 reach the eye box 15 in the present embodiment.

Figure 18:
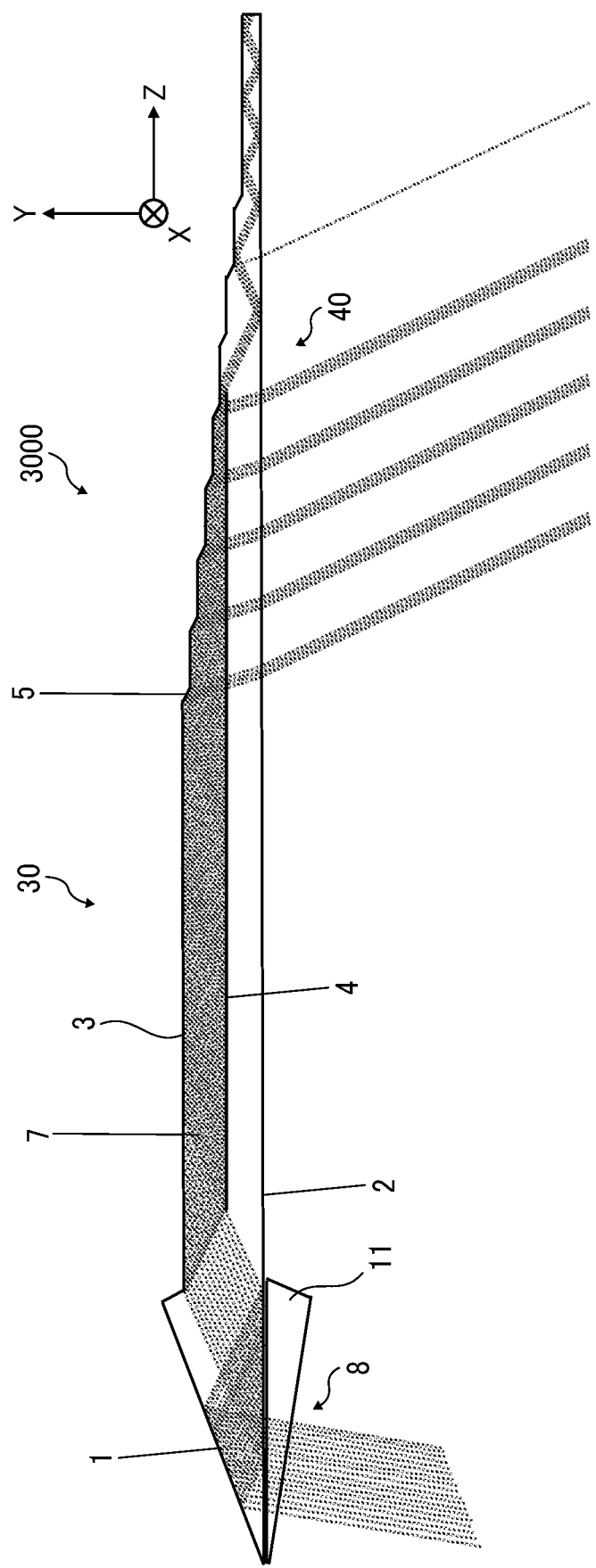
FIG. 18 is a plan view of how a light is guided when a light is incident on a light guide with a relatively wide reflection angle, according to the fifth embodiment of the present disclosure.

FIG. 18 is a diagram illustrating how a light is guided through the light guide 3000 when such a light is incident on the light guide 3000 under the condition same as the condition in the control sample as illustrated in FIG. 39, according to the fifth embodiment of the present disclosure.

The description or the like of each element or member of the light guide 3000 is omitted as the configuration or structure of these drawings is equivalent to that of FIG. 16 according to the fifth embodiment of the present disclosure. As illustrated in FIG. 18, almost even light beams can be taken out and obtained from the multiple image extraction units 5 that are disposed within an area where the optical-path separator 4 exists between the first reflection plane 2 and the second reflection plane 3.

Figure 19:
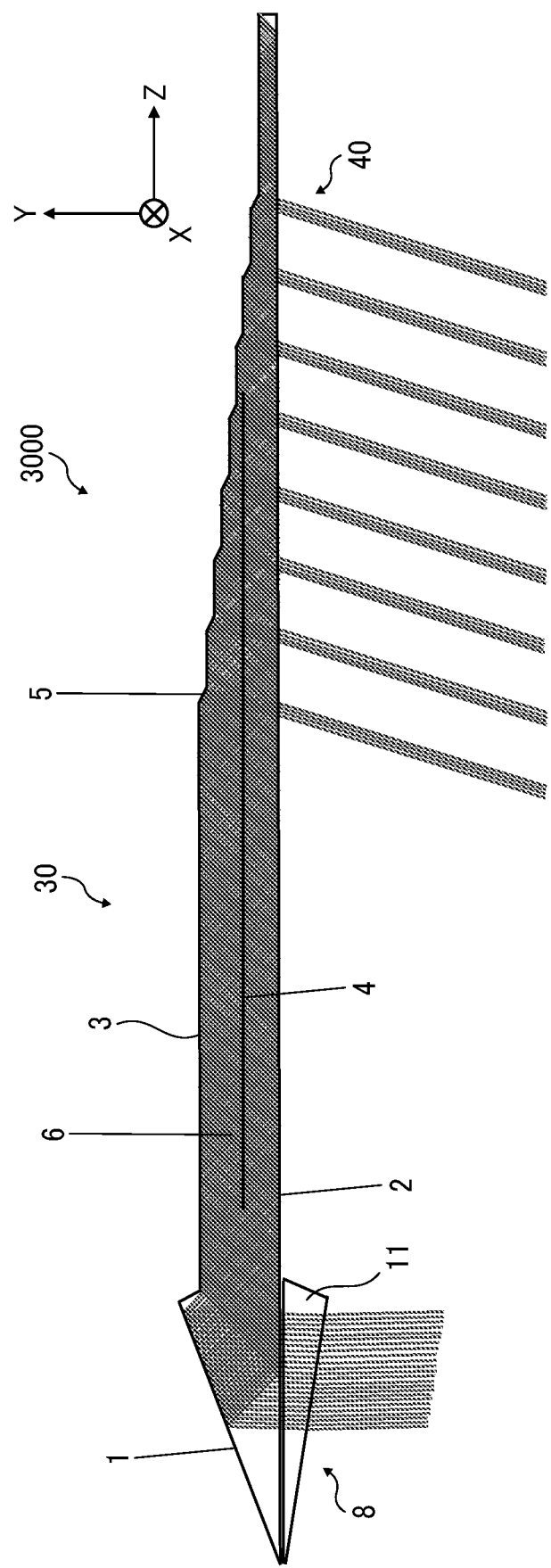
FIG. 19 is a plan view of how a light is guided when the light is incident on a light guide with a relatively narrow reflection angle, according to the fifth embodiment of the present disclosure.

FIG. 19 is a schematic diagram illustrating how a light like the first light wave 6 is incident on the light guide 3000 with a relatively small reflection angle and then is transmitted and guided through the light guide 3000 at a relatively small total-reflection angle.

The description or the like of each element or member of the light guide 3000 is omitted as the configuration or structure of these drawings is equivalent to that of FIG. 16 according to the fifth embodiment of the present disclosure.

The first light wave 6 as illustrated in FIG. 19 does not meet conditions for total reflection when hitting the optical-path separator 4. Accordingly, the first light wave 6 as illustrated in FIG. 19 passes through the boundary surface of the optical-path separator 4, and is guided through the first reflection plane 2 and the second reflection plane 3 with repeated total internal reflection. The first light wave 6 has a small total-reflection angle and thus is totally reflected by the second reflection plane 3 with relatively narrow intervals. Due to this configuration, almost all area of the second reflection plane 3 is irradiated with the light beams with varying angles of view that have approximately been collimated, and some light beams are taken out to the outside of the light guide 3000 through all of the multiple image extraction units 5.

Modification

Figure 20:
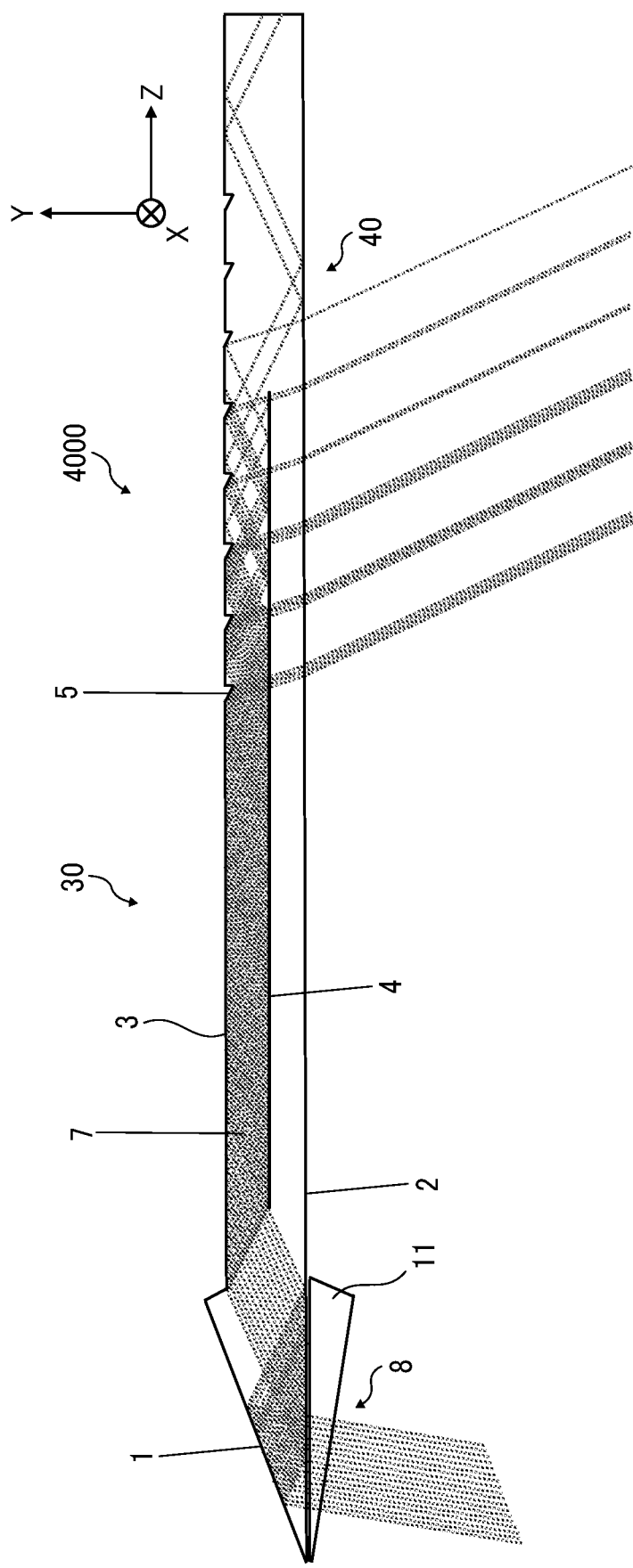
FIG. 20 is a plan view of how a light is guided when the light is incident on a light guide with a relatively wide reflection angle, according to a modification of the fifth embodiment of the present disclosure.

FIG. 20 is a diagram illustrating a light guide 4000 according to a modification of the above embodiment of the present disclosure.

In such a modification of the above embodiment of the present disclosure, the size of each space between the second reflection plane 3 and the first reflection plane 2 that are divided into a plurality of segments or areas remain unchanged. In other words, the size of the space between the second reflection plane 3 and the first reflection plane 2 does not get narrow as the position shifts in the Z-direction that is the light-guiding direction.

Moreover, FIG. 20 illustrates how a light wave like a second light wave 7 is guided through the light guide 4000 with a relatively wide total-reflection angle.

Also in the configuration or structure according to the modification of the fifth embodiment of the present disclosure as illustrated in FIG. 20, at least one optical-path separator 4 is provided between the first reflection plane 2 and the second reflection plane 3, and is detached from the optical entrance. The description or the like of each element or member of the light guide 3000 except for the multiple image extraction units 5 and a plurality of sub-reflection planes provided for those image extraction units 5 is omitted as the configuration or structure of these drawings is equivalent to that of FIG. 16 according to the fifth embodiment of the present disclosure.

As illustrated in FIG. 20, the light wave that is emitted to one of the multiple image extraction units 5 is reflected by the multiple image extraction units 5, and passes through the optical-path separator 4 and is ejected and taken out to the outside of the light guide 3000. However, the light intensity of the light that reaches the image extraction units 5 may decrease as the light travels to the tail end of the multiple image extraction units 5 that are arranged in the direction of travel of the light, and no light may be taken out through some of the multiple image extraction units 5.

In view of that point, if the size of the space between the second reflection plane 3 and the first reflection plane 2 that are divided into a plurality of segments or areas is gradually reduced in the light-guiding direction (i.e., in the Z-direction) as in the configuration or structure according to the fifth embodiment of the present disclosure, the gap between a pair of light beams to be taken out can be eliminated, or the gap between a pair of light beams to be taken out can at least be reduced. However, if the optical-path separator 4 is arranged between the first reflection plane 2 and the second reflection plane 3 in the modification of the fifth embodiment of the present disclosure as illustrated in FIG. 20 where the size of the space between the second reflection plane 3 and the first reflection plane 2 does not change, the gap between a pair of light beams to be taken out can at least be reduced.

Figure 21:
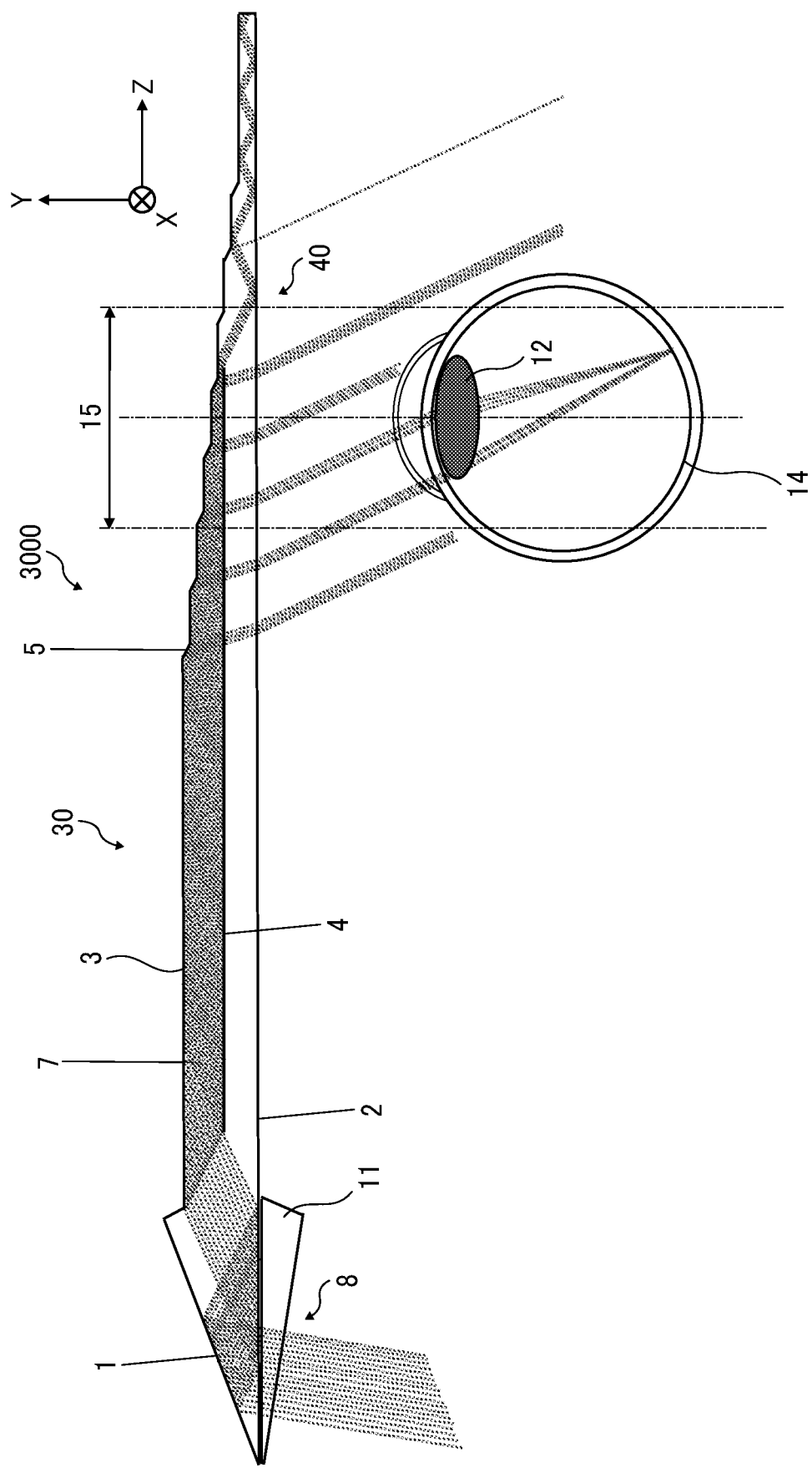
FIG. 21 is a plan view of how a light is guided through a light guide when a light is incident on a light guide with a relatively large reflection angle and the image based on the incident light is observed as a virtual image at the center of an eye box, according to the fifth embodiment of the present disclosure.
Figure 22:
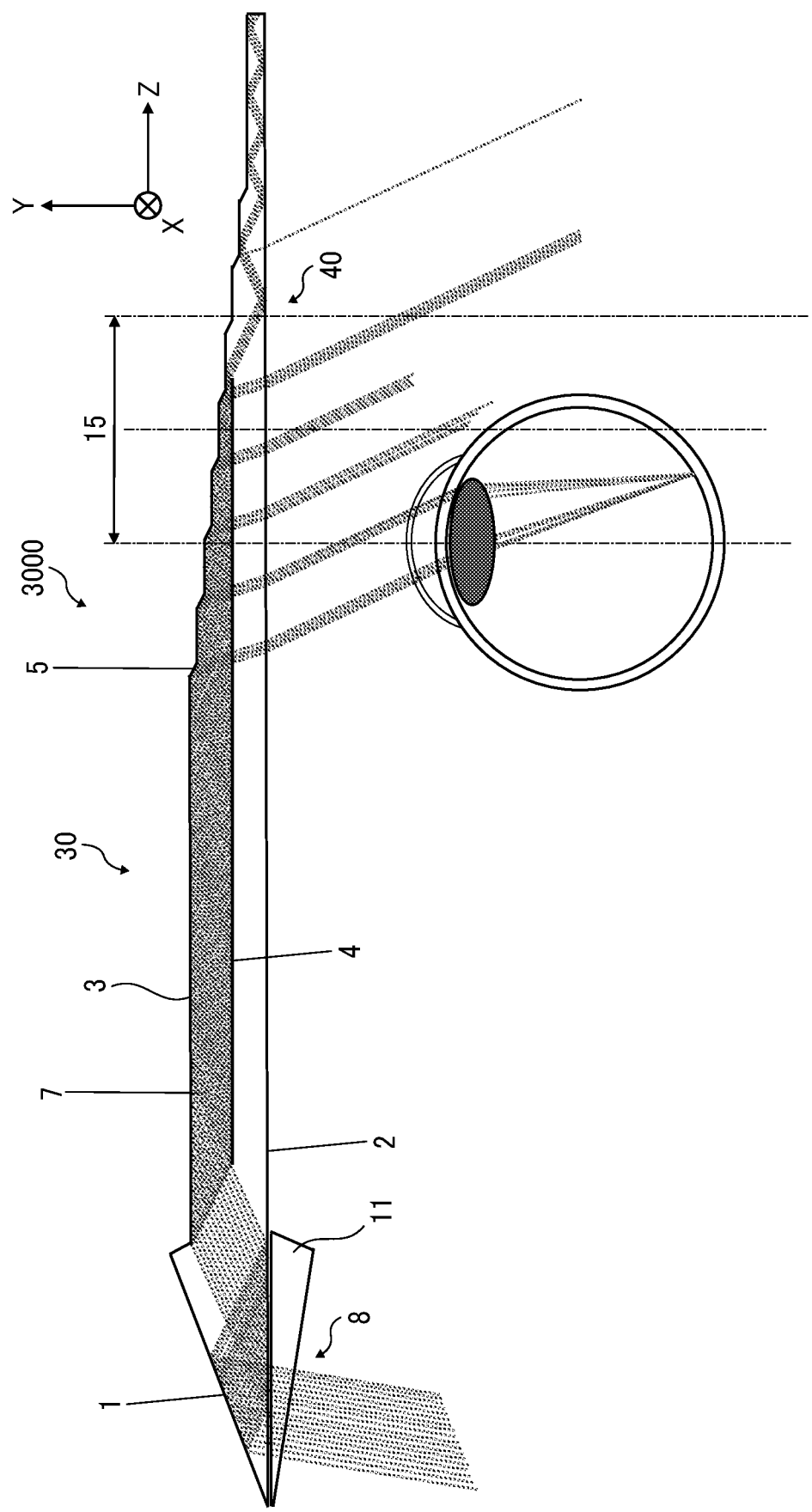
FIG. 22 is a plan view of how a light is guided through a light guide when a light is incident on a light guide with a relatively large reflection angle and the image based on the incident light is observed as a virtual image at a left side of an eye box, according to the fifth embodiment of the present disclosure.
Figure 23:
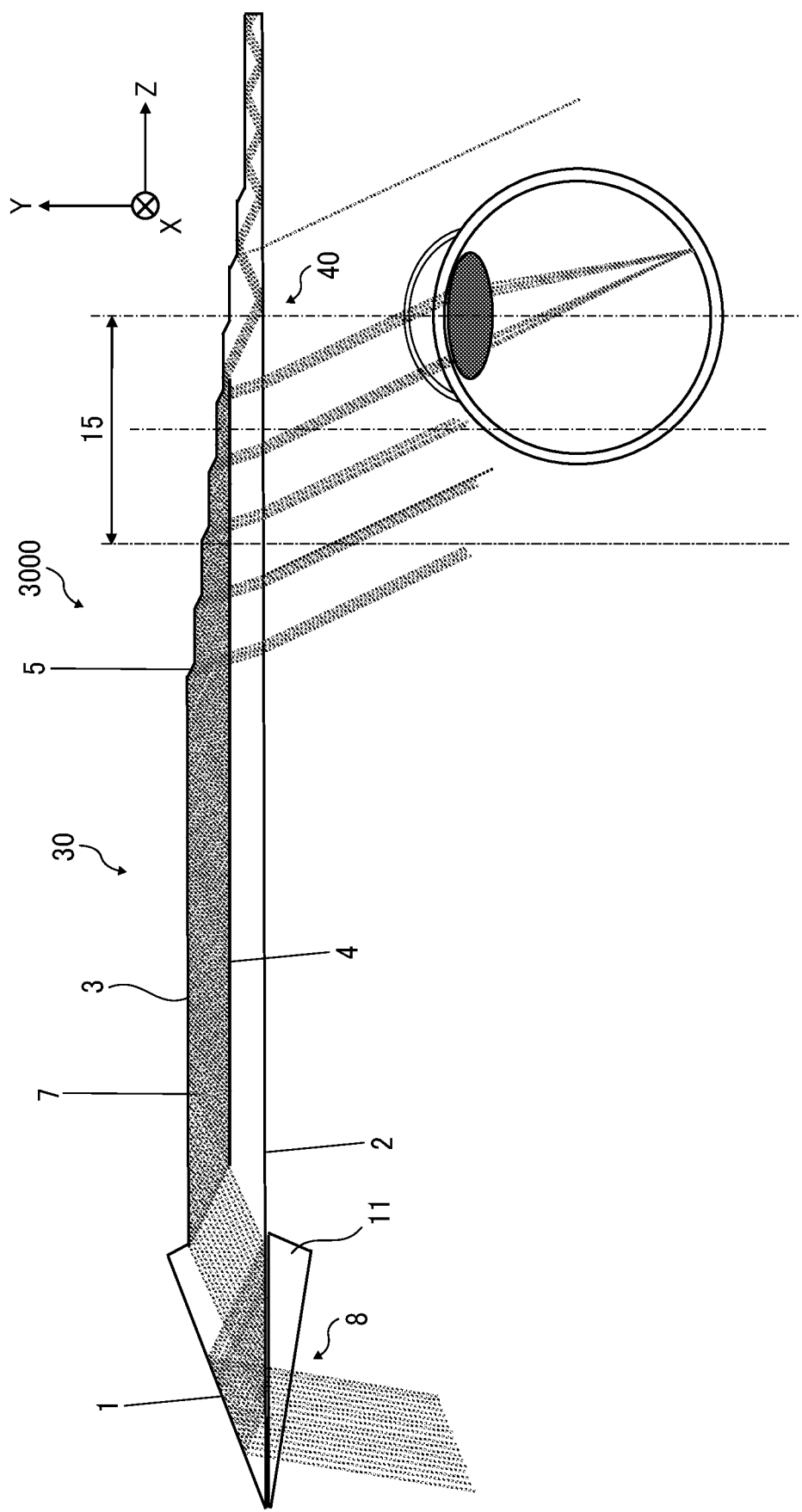
FIG. 23 is a plan view of how a light is guided through a light guide when a light is incident on a light guide with a relatively large reflection angle and the image based on the incident light is observed as a virtual image at a right side of an eye box, according to the fifth embodiment of the present disclosure.

FIG. 21, FIG. 22, and FIG. 23 are diagrams each illustrating how the light reaches a retina 14 through a crystalline lens 12 of an eye of a user and an image is formed in the light guide 3000 when the second light wave 7 is transmitted with the second reflection angle th $\theta_2$ that is relatively wide and is taken out to the outside of the light guide 3000 through the multiple image extraction units 5, according to the fifth embodiment of the present disclosure.

FIG. 21 is a diagram illustrating a situation in which an eye is at the center of the eye box 15, according to the present embodiment.

FIG. 22 is a diagram illustrating a situation in which an eye is at the left edge of the eye box 15, according to the present embodiment.

FIG. 23 is a diagram illustrating a situation in which an eye is at the right edge of the eye box 15, according to the present embodiment.

The description or the like of each element or member of the light guide 3000 is omitted as the configuration or structure of these drawings is equivalent to that of FIG. 16 according to the fifth embodiment of the present disclosure. In the present embodiment as illustrated in FIG. 21, FIG. 22, and FIG. 23, even light beams can be taken out from the multiple image extraction units 5 and an image is formed on the retina 14 based on the even light beams, regardless of the position of an eye within the eye box 15.

Figure 24:
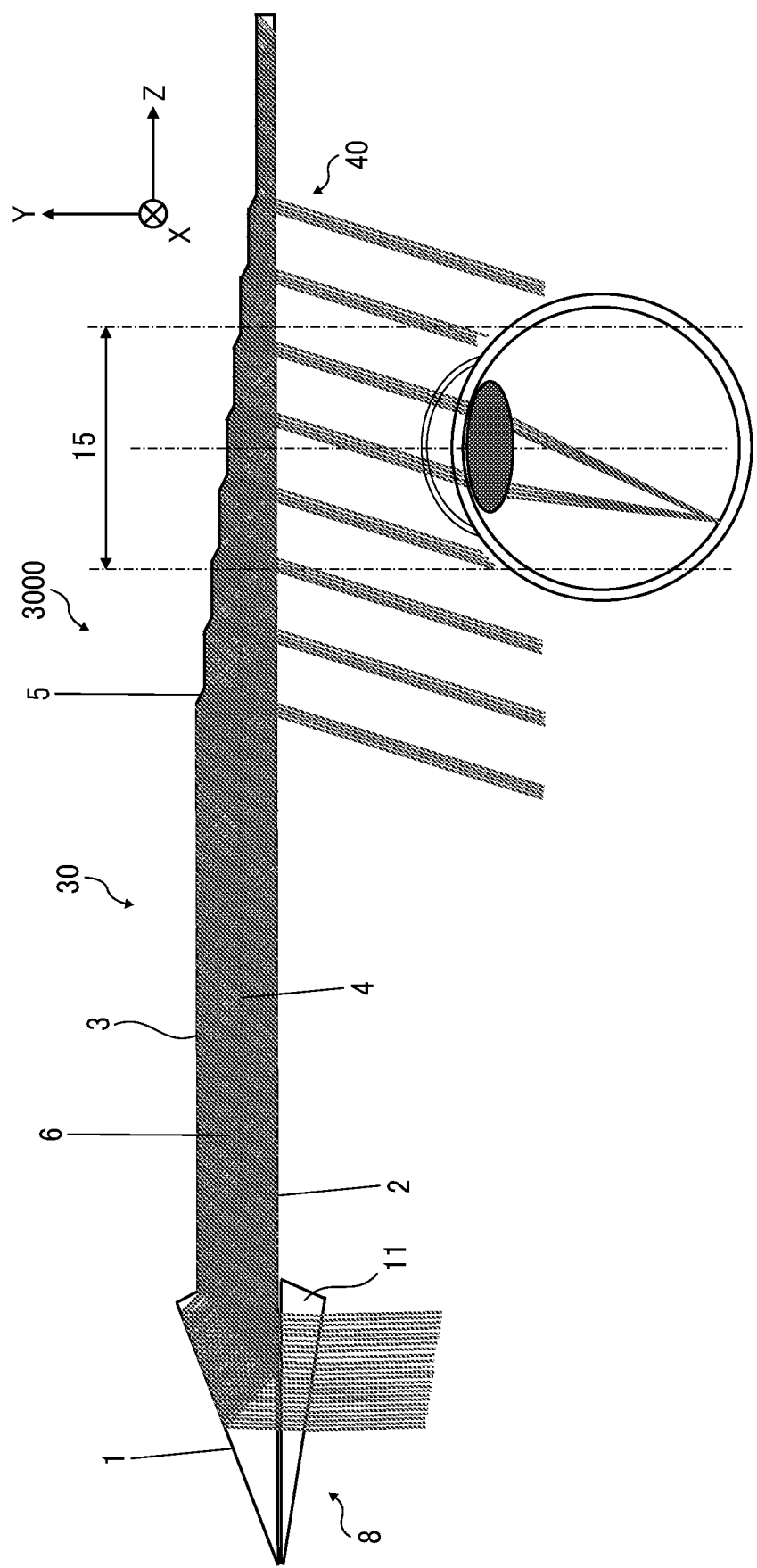
FIG. 24 is a plan view of how a light is guided through a light guide when a light is incident on a light guide with a relatively small reflection angle and the image based on the incident light is observed as a virtual image at the center of an eye box, according to the fifth embodiment of the present disclosure.
Figure 25:
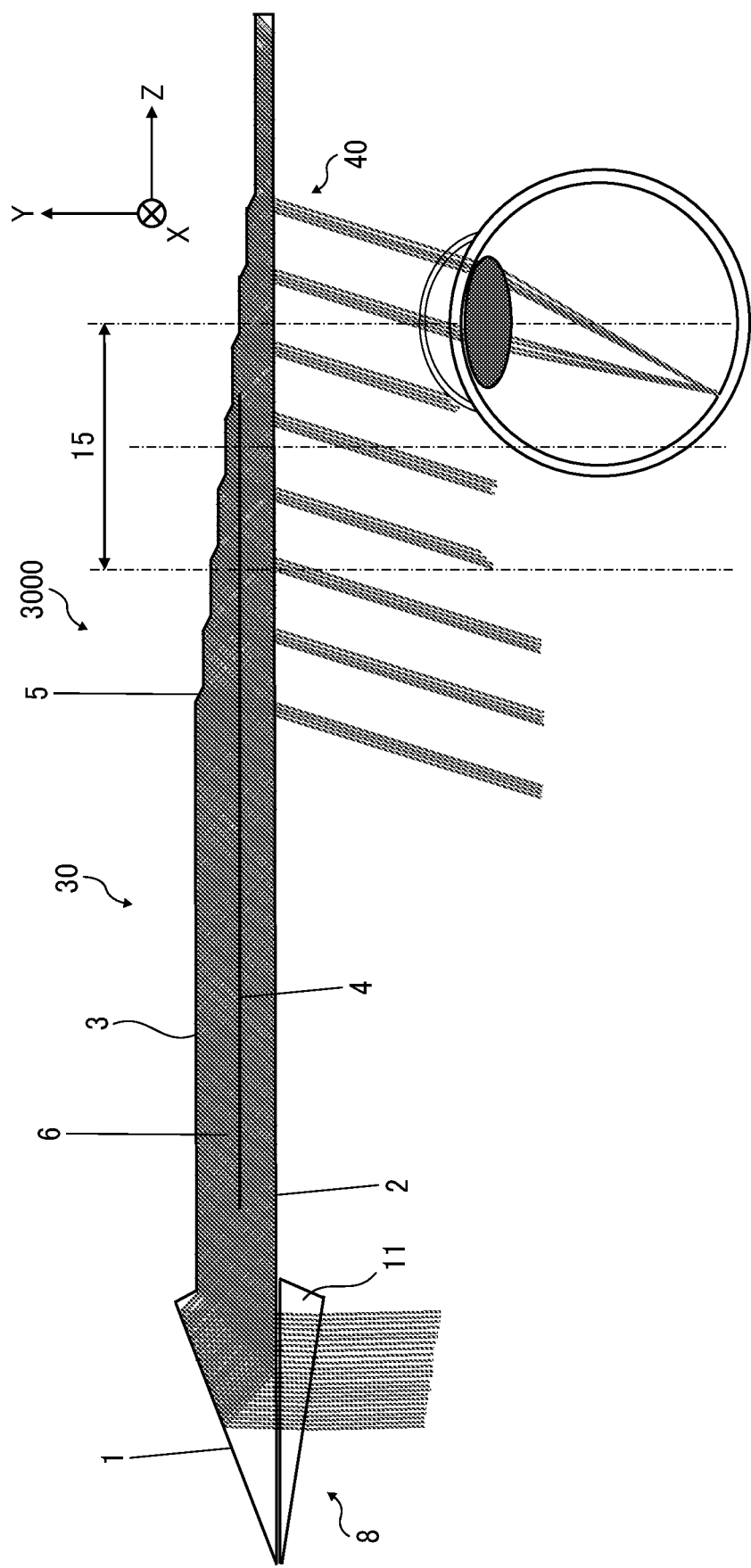
FIG. 25 is a plan view of how a light is guided through a light guide when a light is incident on a light guide with a relatively small reflection angle and the image based on the incident light is observed as a virtual image at a right side of an eye box, according to the fifth embodiment of the present disclosure.
Figure 26:
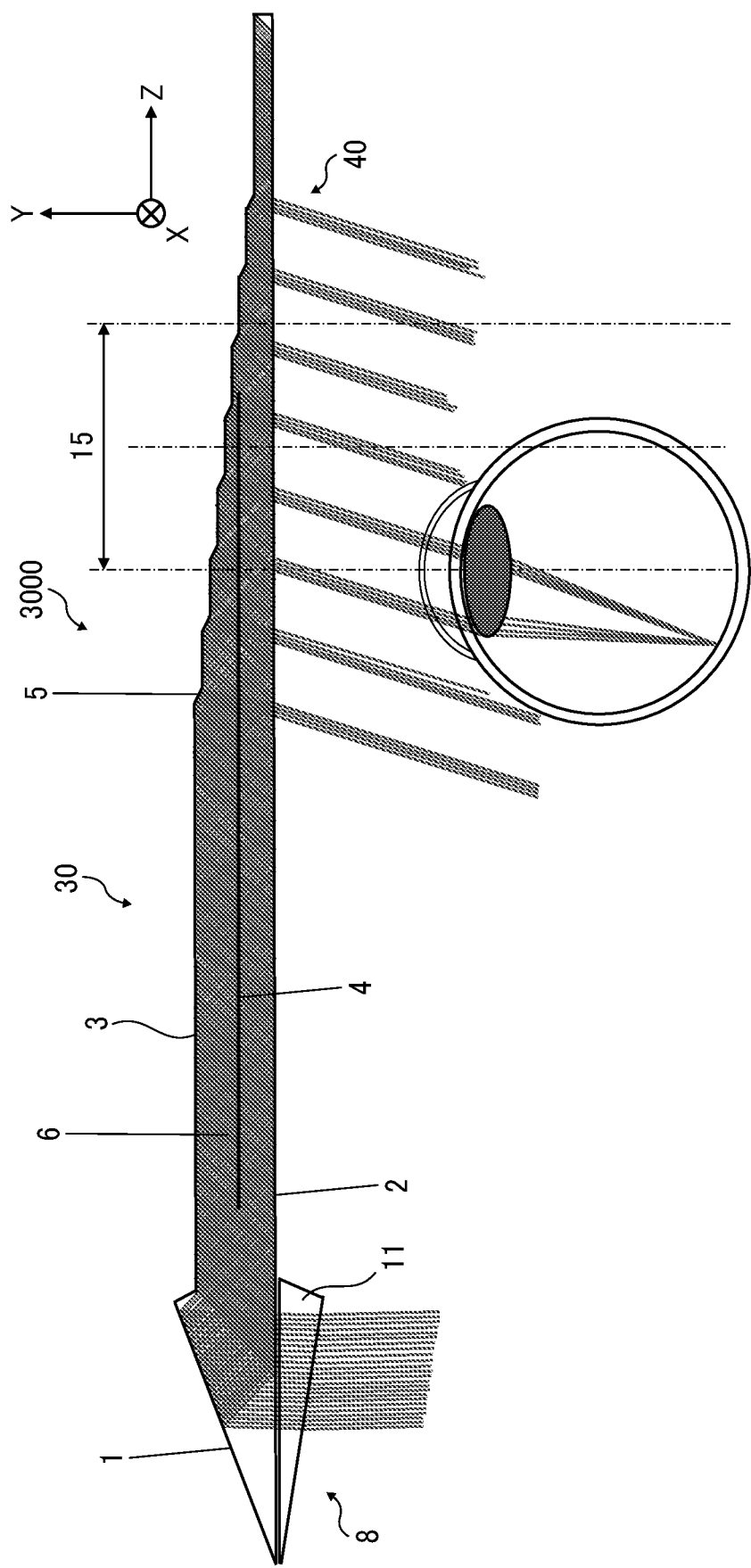
FIG. 26 is a plan view of how a light is guided through a light guide when a light is incident on a light guide with a relatively small reflection angle and the image based on the incident light is observed as a virtual image at a left side of an eye box, according to the fifth embodiment of the present disclosure.

FIG. 24, FIG. 25, and FIG. 26 are diagrams each illustrating how the light reaches the retina 14 through the crystalline lens 12 of an eye of a user and an image is formed in the light guide 3000 when the first light wave 6 is transmitted with the first reflection angle $\theta_1$ that is relatively narrow and is taken out to the outside of the light guide 3000 through the multiple image extraction units 5, according to the fifth embodiment of the present disclosure.

FIG. 24 is a diagram illustrating a situation in which an eye is at the center of the eye box 15, according to the present embodiment.

FIG. 25 is a diagram illustrating a situation in which an eye is at the left edge of the eye box 15, according to the present embodiment.

FIG. 26 is a diagram illustrating a situation in which an eye is at the right edge of the eye box 15, according to the present embodiment.

The description or the like of each element or member of the light guide 3000 is omitted as the configuration or structure of these drawings is equivalent to that of FIG. 16 according to the fifth embodiment of the present disclosure. In the present embodiment as illustrated in FIG. 24 FIG. 25, and FIG. 26, even light beams can be taken out from the multiple image extraction units 5 and an image is formed on the retina 14 based on the even light beams, regardless of the position of an eye within the eye box 15.

As understood from the above description with reference to FIG. 21 to FIG. 26, at least one optical-path separator 4 is provided between the first reflection plane 2 and equal to or more than half of the multiple image extraction units 5. Due to such a configuration, the width of eye box 15 can be increased to have a sufficient size.

The light that is guided within the light guide 3000 with a relatively wide total-reflection angle is emitted to the eye box 15 as the light that is taken out and emitted from one of the multiple image extraction units 5 on the optical entrance 8 side. By contrast, the light that is guided within the light guide 3000 at a first reflection angle $\theta_1$ is emitted to the eye box 15 as the light that is taken out and emitted from one of the multiple image extraction units 5 on the opposite side of the optical entrance 8. In an augmented reality (AR) display, the retina 14 has to be irradiated with light beams with all the angles of view regardless of the position of an eye within the eye box 15 as a result of eye motion. For this reason, it is beneficial to increase the width of the eye box 15.

As understood from FIG. 24, the light that is guided within the light guide 3000 with a relatively narrow total-reflection angle is guided through the space between the first reflection plane 2 and the second reflection plane 3 with repeated total internal reflection. Due to such a configuration, no dropout error occurs. In order to achieve such functions, at least one optical-path separator 4 is disposed between the first reflection plane 2 and equal to or more than half of the multiple image extraction units 5. Due to this configuration, even if an eye is located at a position further than the center of the area in which the multiple image extraction units 5 exist with respect to the optical entrance 8, the light that is guided within the light guide 3000 with a relatively wide total-reflection angle can be observed, and the area from which the light can be observed increases.

Figure 27:
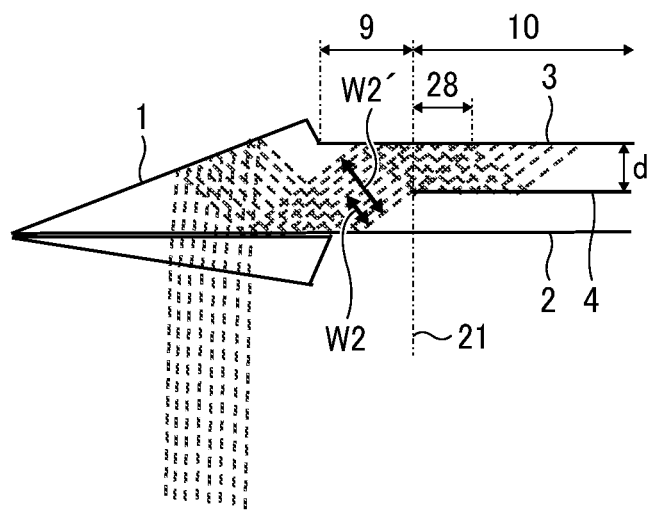
FIG. 27 is a partial plan view of a light guide indicating the position of an optical-path separator where no dropout error of image occurs, according to the fifth embodiment of the present disclosure.

FIG. 27 is a diagram illustrating conditions for achieving a state in which almost all area of the second reflection plane 3 is irradiated with the second light wave 7 when the second light wave 7 is guided between the second reflection plane 3 and the optical-path separators 4 with repeated total internal reflection at the second reflection angle θ2, according to the fifth embodiment of the present disclosure.

The description or the like of each element or member of the light guide 3000 is omitted as the configuration or structure of these drawings is equivalent to that of FIG. 16 according to the fifth embodiment of the present disclosure. An area or site that is not irradiated with the light wave 7 is referred to as a dropout error in the following description.

A dropout error 16 disappears when the relationships in the following two equations hold true.

$$W2/\sin(\theta 2)=d$$

$$W2' \geq W2 \times 2$$

In the above equations, W2 denotes the first light-flux width of the second light wave 7 (see, for example, FIG. 21) that is emitted toward an area 28 of the second reflection plane 3 that totally reflects the incident light for the first time, which is on a rear side in the light-guiding direction than a boundary 21 between the optical-path separation region 10 and the optical-path not-separating region 9 that is closest to the optical entrance 8, and d denotes the distance between the second reflection plane 3 and the optical-path separator 4. Moreover, W2' denotes the second light-flux width of the second light wave 7 that is emitted toward the second reflection plane 3 for the first time.

Figure 28:
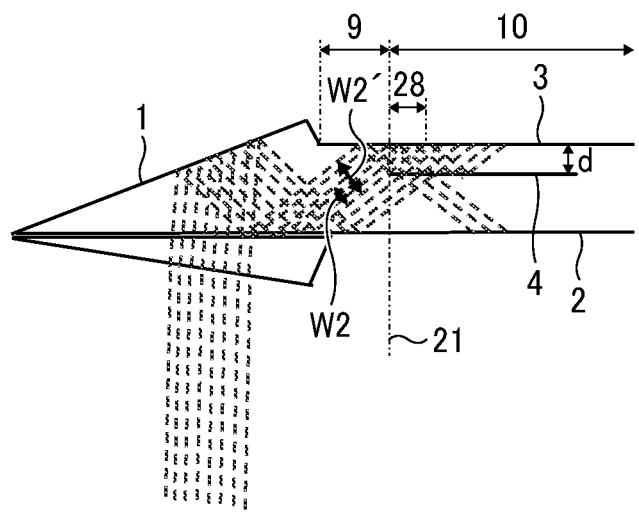
FIG. 28 is another partial plan view of a light guide indicating the position of an optical-path separator where no dropout error of image occurs, according to the fifth embodiment of the present disclosure.

As illustrated in FIG. 28, even if the optical-path separator 4 is located closer to the second reflection plane 3 than in the example configuration as illustrated in FIG. 27, no dropout error occurs as long as the above conditions are met. The description or the like of each element or member of the light guide 3000 is omitted as the configuration or structure of these drawings is equivalent to that of FIG. 16 according to the fifth embodiment of the present disclosure.

Figure 29:
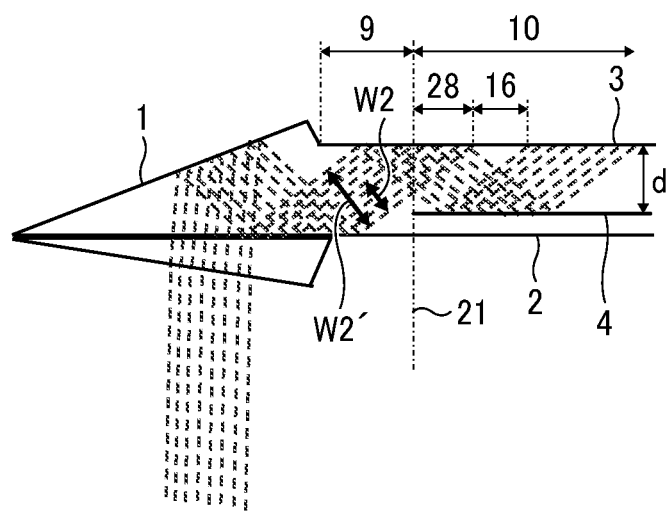
FIG. 29 is a partial plan view of a light guide indicating the position of an optical-path separator where a dropout error of image occurs, according to a control sample of the fifth embodiment of the present disclosure.
Figure 30:
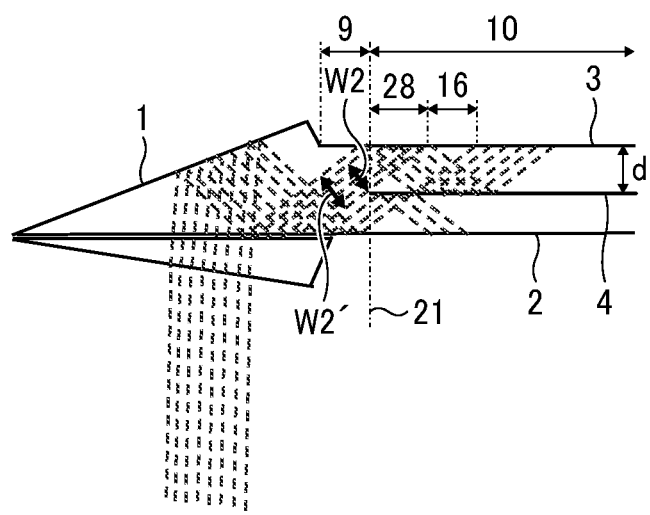
FIG. 30 is another partial plan view of a light guide indicating the position of an optical-path separator where a dropout error of image occurs, according to a control sample of the fifth embodiment of the present disclosure.
Figure 31:
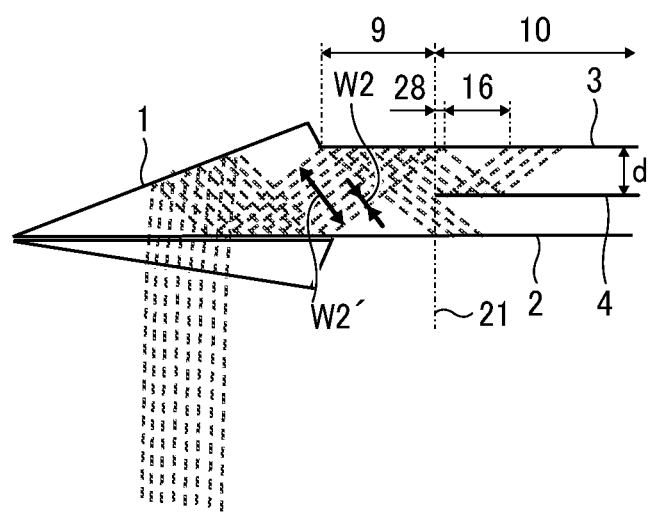
FIG. 31 is further another partial plan view of a light guide indicating the position of an optical-path separator where a dropout error of image occurs, according to a control sample of the fifth embodiment of the present disclosure.

FIG. 29, FIG. 30, and FIG. 31 are diagrams each illustrating conditions for a dropout error as described above to take place, according to the present embodiment.

The dropout error 16 occurs as the relationships in the following two equations do not hold true.

$$W2/\sin(\theta_2)=d$$

$$W2 > W2 \times 2$$

In the above equations, W2 denotes the first light-flux width of the second light wave 7 (see, for example, FIG. 21) that is emitted toward an area 28 of the second reflection plane 3 that totally reflects the incident light for the first time, which is on a rear side in the light-guiding direction than the boundary 21 between the optical-path separation region 10 and the optical-path not-separating region 9 that is closest to the optical entrance 8, and W2' denotes the second light-flux width of the second light wave 7 that is emitted toward the second reflection plane 3 for the first time. Moreover, d denotes the distance between the second reflection plane 3 and the optical-path separator 4.

The description or the like of each element or member of the light guide 3000 is omitted as the configuration or structure of these drawings is equivalent to that of FIG. 16 according to the fifth embodiment of the present disclosure.

In the condition as illustrated in FIG. 29, the conditions in regard to W2, W2', and θ₂ are equivalent to the conditions in the example configuration as illustrated in FIG. 27. However, the distance d between the second reflection plane 3 and the optical-path separator 4 in the condition as illustrated in FIG. 29 is longer than the conditions as illustrated in FIG. 27. Accordingly, the relation in the following equation is met in a similar manner to the example configuration as illustrated in FIG. 27.

$$W2' \geq W2 \times 2$$

However, the following equation holds true and one of the above equations does not hold true.

$$W2/\sin(\theta_2) < d$$

Accordingly, the dropout error 16 occurs where the second reflection plane 3 is not irradiated with the light wave 7.

In the condition as illustrated in FIG. 30, the conditions in regard to W2, θ₂, and d are equivalent to the conditions in the example configuration as illustrated in FIG. 27. However, the boundary 21 in the condition as illustrated in FIG. 30 is at a position closer to the optical entrance than in the conditions as illustrated in FIG. 27. Accordingly, some of the light flux that is totally reflected first by the first reflection plane 2 and then and travels toward the second reflection plane 3 in light-guiding direction is totally reflected by optical-path separator 4, and the second light-flux width W2' is narrower than the condition as described above with reference to FIG. 27. Accordingly, the relationship in the following equation is satisfied.

$$W2/\sin(\theta_2)=d$$

However, the following equation holds true and one of the above equations does not hold true.

$$W2' < W2 \times 2$$

Accordingly, the dropout error 16 occurs on the second reflection plane 3.

In the condition as illustrated in FIG. 31, the conditions in regard to W2', θ₂, and d are equivalent to the conditions in the example configuration as illustrated in FIG. 27. However, the boundary 21 in the condition as illustrated in FIG. 31 is at a position further from the optical entrance than in the conditions as illustrated in FIG. 27. For this reason, the first light-flux width W2 is narrower than the condition as described above with reference to FIG. 27.

Accordingly, the relationship in the following equation is satisfied.

$$W2' \geq W2 \times 2$$

However, the following equation holds true and one of the above equations does not hold true.

$$W2/\sin(\theta_2) < d$$

Accordingly, the dropout error 16 occurs on the second reflection plane 3.

As in the example configurations as illustrated in FIG. 29, FIG. 30, FIG. 31, when the dropout error 16 occurs and one of the image extraction units 5 is located at the position of the dropout error 16, the light cannot be taken out through that image extraction unit 5, and unevenness in brightness or a dropout error of brightness occurs on a virtual image to be observed. The conditions need to be designed to prevent the dropout error 16.

Figure 32:
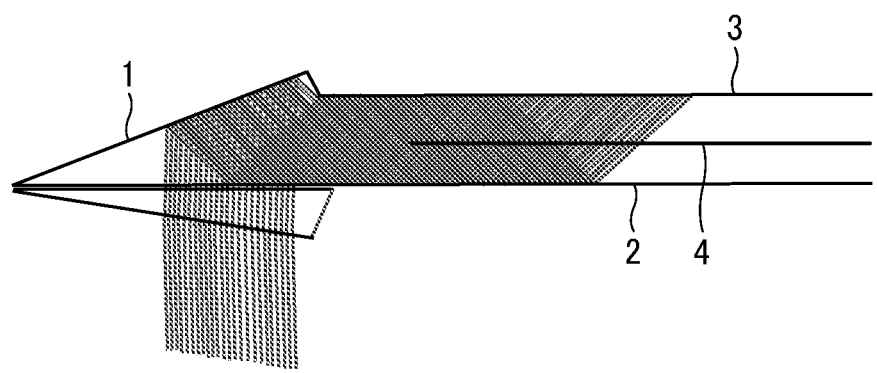
FIG. 32 is a partial plan view of a light guide indicating the position of an optical-path separator where no dropout error of image occurs, according to the fifth embodiment of the present disclosure.
Figure 33:
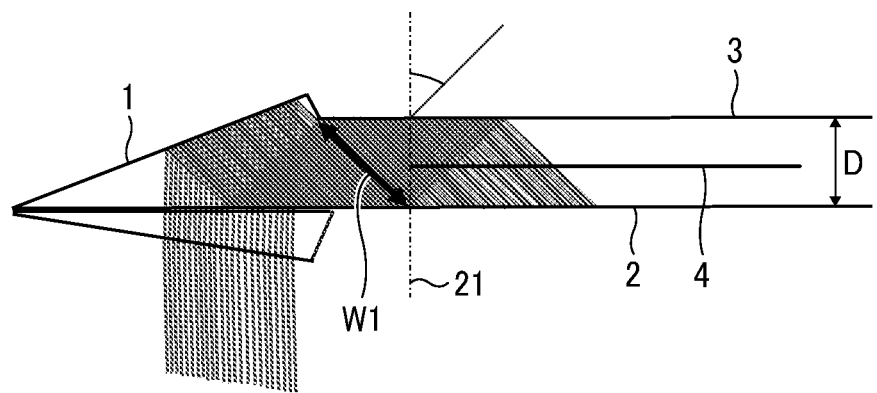
FIG. 33 is a partial plan view of a light guide, indicating the light flux when an optical-path separator is at a position where a dropout error of image occurs, according to a control sample of the fifth embodiment of the present disclosure.

FIG. 32 and FIG. 33 are diagrams each illustrating the conditions for the first light wave 6, which is guided between the first reflection plane 2 and the second reflection plane 3 with repeated total internal reflection at the first reflection angle $\theta_1$, not to cause any dropout error on the second reflection plane 3 in the light guide 3000, according to the present embodiment.

The description or the like of each element or member of the light guide 3000 is omitted as the configuration or structure of these drawings is equivalent to that of FIG. 16 according to the fifth embodiment of the present disclosure.

FIG. 32 and FIG. 33 are diagrams each illustrating the first light wave 6 whose entirety of light that does not meet the conditions for total reflection by the optical-path separator 4 and thus passes through the optical-path separator 4, according to the present embodiment.

When the condition in the equation given below is satisfied, the dropout error 16 due to the first light wave 6 disappears.

$$W1/(2 \times \sin(\theta_1)) = D$$

In the above equation, W1 denotes the third light-flux width of the first light wave 6 that is emitted to an area of the second reflection plane 3 that totally reflects the incident light for the first time. Moreover, D denotes the distance between the first reflection plane 2 and the second reflection plane 3 at an area of the second reflection plane 3 that totally reflects the incident light for the first time.

The above condition needs to be satisfied in order to eliminate the chances of a dropout error of brightness or unevenness in brightness due to the first light wave 6 under the above condition.

Figure 34:
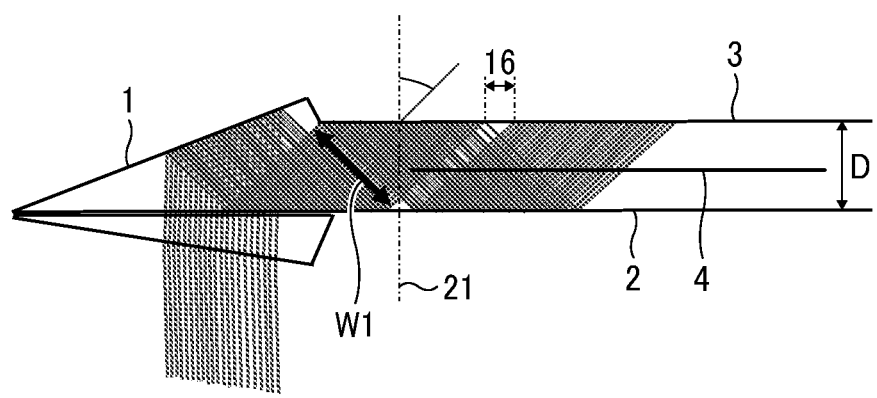
FIG. 34 is another partial plan view of a light guide, indicating the light flux when an optical-path separator is at a position where a dropout error of image occurs, according to a control sample of the fifth embodiment of the present disclosure.

FIG. 34 is a diagram illustrating a state in which the dropout error 16 occurs as the light does not meet conditions for total reflection, according to a control sample of the above embodiment of the present disclosure.

The light guide 3000 may be configured so as to satisfy the above-described conditions for a reflection plane not to cause any dropout error. By so doing, the chances of a dropout error of brightness or unevenness in brightness on an image to be visually recognized can be reduced in both cases of the reflection angle $\theta_1$ that is relatively narrow and the reflection angle $\theta_2$ that is relatively wide. As the first reflection plane 102 and the second reflection plane 103 can guide both the light with a relatively wide reflection angle and the light with a relatively narrow reflection angle, the field angle of the image can be increased, and the angle of visibility of a virtual image to be observed can be widened.

Sixth Embodiment

Figure 35:
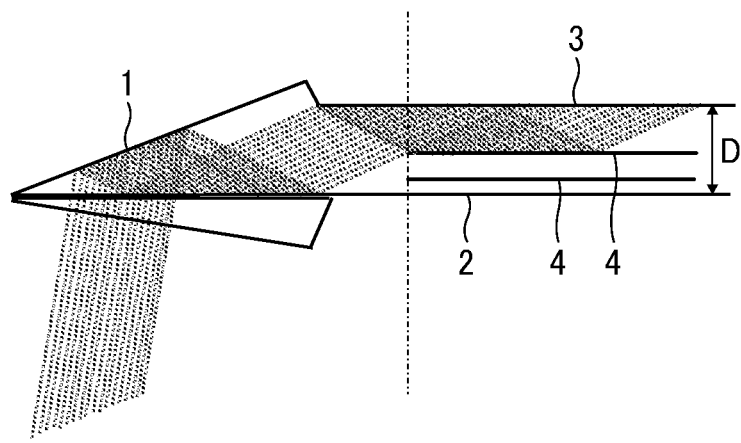
FIG. 35 is a partial plan view of a light guide that includes a plurality of optical-path separators, according to a sixth embodiment of the present disclosure.
Figure 36:
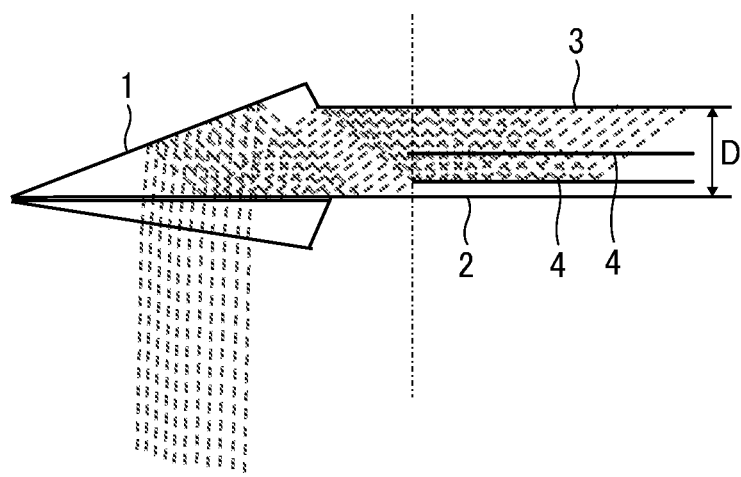
FIG. 36 is another partial plan view of a light guide that includes a plurality of optical-path separators, according to the sixth embodiment of the present disclosure.

FIG. 35 and FIG. 36 are diagrams each illustrating a part of the light guide 3000 in which the optical-path separator 4 has two layers, according to a sixth embodiment of the present disclosure.

The members of the light guide 3000 other than optical-path separator 4 are equivalent to the members in the configuration or structure according to the fifth embodiment of the present disclosure as illustrated in FIG. 16, and thus its detailed description is omitted. As illustrated in FIG. 35 and FIG. 36, the optical-path separator is divided into two layers including the optical-path separator 4 that is close to the first reflection plane 2 and the optical-path separator 4 that is close to the second reflection plane 3, and these two layers are arranged on top of one another so as to be parallel with each other, having a certain space therebetween.

As illustrated in FIG. 35, the second light wave 7 is totally reflected by one of the optical-path separators 4 that is closer to the second reflection plane 3 than the other optical-path separator at the second reflection angle $\theta_2$. As illustrated in FIG. 36, a light wave whose total-reflection angle is narrower than that of the second light wave 7 and is wider than that of the first light wave 6 passes through one of the optical-path separators 4 that is close to the second reflection plane 3, and is totally reflected by one of the optical-path separators 4 that is close to the first reflection plane 2 as the conditions for total reflection are met.

As described above, the optical-path separator 4 is provided in a plurality of layers in the present embodiment. Due to such a configuration, the dropout error 16 can be eliminated while maintaining a wide light-flux width for each angle of view. In order to provide and enable a plurality of layers of optical-path separators 4, the critical angle of one of the optical-path separators 4 that is closer to the first reflection plane 2 than the other optical-path separator is reduced to have a smaller value than the other optical-path separator. The critical angle is determined based on the relation between the refractive index of the optical-path separator 4 and the refractive index of the light guiding unit 30. For this reason, the refractive index of the optical-path separator may be reduced depending on the relative positions of the first reflection plane 2 and each layer of the multiple optical-path separators 4 so as to arrange a plurality of optical-path separators 4. The conditions for such a plurality of optical-path separators are described below in detail.

It is assumed that the optical-path separator 4 consists of i thin films. The relation in the following formula needs to be satisfied.

$$d(m) < d(m-p) < D$$

In the above formula, d(m) denotes the distance between the second reflection plane 3 and the m-th optical-path separator 4 counted from the first reflection plane 2, and D denotes the distance between the first reflection plane 2 and the second reflection plane 3. Moreover, p denotes any desired natural number that is equal to or greater than one and less than i.

Moreover, the relation in the following formula needs to be satisfied.

$$n(m-p) < n(m) < N$$

In the above formula, n(m) denotes the refractive index of the m-th optical-path separator 4. Moreover, N denotes the refractive index of the light guiding unit 30.

Note also that i denotes a natural number equal to or greater than two, and m denotes a natural number equal to or greater than two but equal to or less than i. Moreover, p denotes a natural number equal to or greater than one but less than m.

Figure 37:
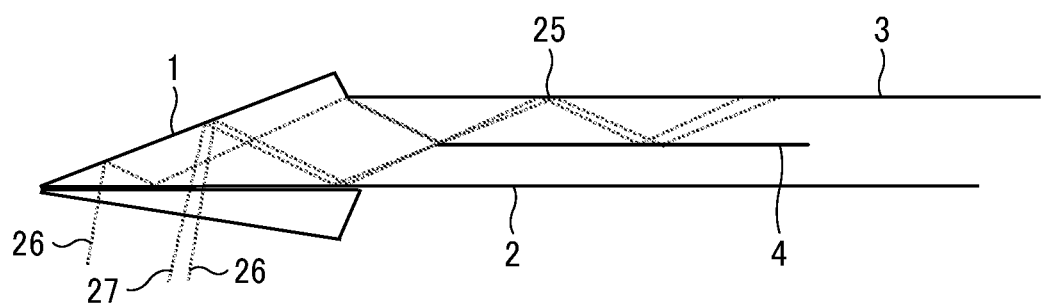
FIG. 37 is a partial plan view of a light guide, indicating how light flux travels forward when the elements of the light flux are not parallel to each other, according to the sixth embodiment of the present disclosure.

FIG. 37 is a diagram illustrating a case in which light beams with varying angles of view are transmitted with repeated dispersion in order to display a virtual image at a short distance, according to the sixth embodiment of the present disclosure.

As illustrated in FIG. 37, when both the light wave that is reflected by the second reflection plane 3 at the second reflection angle $\theta_2$ and the light wave that is reflected by the second reflection plane 3 at the total-reflection angle $\theta_2+\Delta\theta$ exist in a mixed manner, some areas of the second reflection plane 3 may be irradiated with two or more light waves in an overlapping manner, and the intensity of irradiation increases at such areas of the second reflection plane 3. When the image is formed by the parallel light that is completely collimated and the intensity of such collimated parallel light is even, the intensity of the light with which the second reflection plane 3 is irradiated is even. In FIG. 37, reference sign 25 indicates an area at which light flux overlap with different light flux, and reference sign 26 indicates a light beam whose reflection angle on the second reflection plane 3 is $\theta_2$. Moreover, reference sign 27 indicates a light beam whose reflection angle on the second reflection plane 3 is $\theta_2+\Delta\theta$. The configuration or structure of the light guide according to the present embodiment is equivalent to the configuration or structure according to the fifth embodiment of the present disclosure as illustrated in FIG. 16, and thus its detailed description is omitted.

A virtual-image display device may be configured using the light guide 3000 according to the above embodiments of the present disclosure as described above.

As illustrated in FIG. 40, such a virtual-image display device includes an image display apparatus 50 that outputs the image light of a displayed image, a collimator optical system 51 that collimates the light emitted from the image display apparatus 50 and emits the collimated light, and the light guide 3000 according to the above embodiment of the present disclosure as a virtual-image displaying optical system.

The image display apparatus 50 is a device that outputs the image light of a display image that forms a virtual image that is projected and displayed through the light guide 3000. An organic light emitting diode (OLED) or a liquid crystal display (LCD) is preferably used for the image display apparatus 50. However, no limitation is indicated thereby, and other various kinds of display element may be used for the image display apparatus 50. For example, a digital micromirror device (DMD) may be used as the image display apparatus 50. Alternatively, a thin film transistor (TFT) or a liquid crystal on silicon (LCoS) may be used as the image display apparatus 50. Further, a micro-electromechanical system (MEMS) may be used as the image display apparatus 50.

In the embodiment as illustrated in FIG. 40, cases in which, for example, a liquid crystal on silicon (LCoS) and a digital micromirror device (DMD) that require a light source are used for the image display apparatus 50 are described, and the light source 52 that emits illumination light to irradiates the image display surface of the image display apparatus 50 with light is added. Various kinds of elements or devices may be used for the light source 52, and for example, a light-emitting diode (LED), a semiconductor laser, a laser diode (LD), or a discharge lamp may be used as the light source 52.

The collimator optical system 51 is configured by, for example, a plurality of optical lenses or stops, and magnifies the light that is output from the image display apparatus 50 and ejects collimated light.

According to such a virtual-image display device, the light that is formed by the image display apparatus 50 as emitted from the light source 52 is magnified by the collimator optical system 51, and is incident on the light guide 3000. In other words, the light that is magnified by the collimator optical system 51 is incident on the optical entrance 8 of the light guide 3000, and is guided to the inside of the light guide 3000 as reflected by the mirror 1. As described above as the configuration according to the fifth embodiment of the present application, the light is further guided to the light beam ejection unit 40. Then, the guided light is ejected from the light beam ejection unit 40 toward the eyes of a user as image data. Due to this configuration, a user of the virtual-image display device can visually recognize a virtual image by looking at the sight ahead of the light guide 3000 through the light beam ejection unit 40 of the light guide 3000.

In the embodiments of the present disclosure as described above with reference to FIG. 16 to FIG. 40, cases in which the optical entrance 8 of the light guide 3000 is arranged on the left side of an observer who observes a virtual image and the light is incident on the light guide 3000 from the left side of the observer who observes a virtual image are described. Even if the arrangement or structure as described above is reversed in the right and left directions, i.e., even if the optical entrance 8 of the light guide 3000 is arranged on the right side of an observer who observes a virtual image and the light is incident on the light guide 3000 from the right side of the observer who observes a virtual image, advantageous effects similar to those of the above embodiments of the present disclosure can be achieved.

Figure 41A:
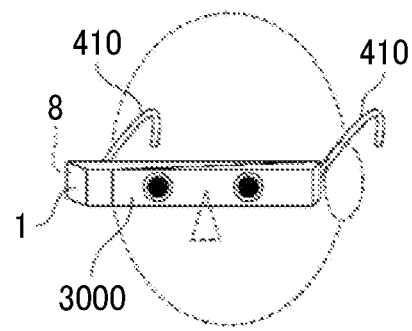
FIG. 41A, FIG. 41B, and FIG. 41C are perspective views of a virtual-image display device that uses the light guide according to the above embodiments of the present disclosure, indicating an in-use condition of such a virtual-image display device of various types.
Figure 41B:
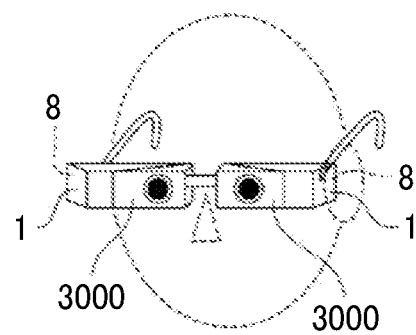
Figure 41C:
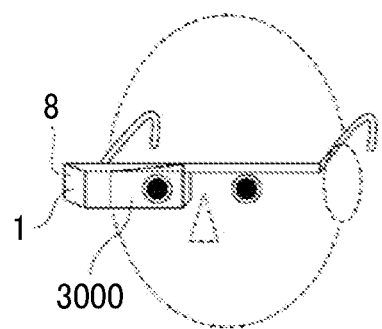

FIG. 41A, FIG. 41B, and FIG. 41C are diagrams each illustrating a cases in which the light guide 3000 according to the fifth embodiment of the present disclosure is used for a virtual-image display device configured like glasses, i.e., a head-mounted display (HMD), according to an embodiment of the present disclosure.

More specifically, FIG. 41A is a diagram illustrating a case in which a single light guide 3000 is used for a head-mounted display (HMD) for both eyes, and the optical entrance 8 of the light guide 3000 is arranged on the right side of a user that is an observer who observes a virtual image. The light guide 3000 according to the present embodiment is fixed to a pair of frames 410 that serves as a sidepiece of the glasses hung on the ears of the user. In FIG. 41A, FIG. 41B, and FIG. 41C, the pair of frames 410 are illustrated in a simplified manner. However, no limitation is indicated thereby, and it is not always necessary for the pair of frames 410 to be arranged on both sides of the light guide 3000. The pair of frames 400 may be shaped as a single unit to cover the edge on the topside or bottom side of the light guide 3000.

By contrast, FIG. 41B and FIG. 41C are diagrams each illustrating an embodiment in which a single light guide 3000 is downsized and is used for a head-mounted display (HMD) for a single eye. More specifically, FIG. 41B is a diagram illustrating a case in which a pair of light guides 3000 are arranged so as to be suited for both right and left eyes of the user, and the optical entrance 8 of each one of the light guides 3000 is arranged at an extraneous portion on both right and left sides.

In FIG. 41A, FIG. 41B, and FIG. 41C, the illustration of a virtual image optical system or a light source is omitted. However, such elements may be attached to the pair of frames 400. In other words, in the embodiments as illustrated in FIG. 41A and FIG. 41C, the light source 52, the image display apparatus 50, and the collimator optical system 51 may be attached to one of the pair of frames 410 on the right eye side. In the embodiment as illustrated in FIG. 41B, the light source 52, the image display apparatus 50, and the collimator optical system 51 may be attached to the pair of frames 400 on both right and left sides.

In the embodiments as illustrated in FIG. 41A, FIG. 41B, FIG. 41C, cases in which the light guide 3000 according to the fifth embodiment of the present disclosure is used for a HMD configured like glasses are described as above. Note that the light guide 4000 according to the above modification of the fifth embodiment of the present disclosure may also be used for a HMD configured like glasses. The light guide 3000 according to the above embodiments of the present disclosure may be used for other kinds of HMDs, and may further be used for a heads-up display (HUD). In particular, the light guide 3000 according to the above embodiments of the present disclosure is suited to display a virtual image of the original image that is formed by the light flux that are optically modulated by a minute devices.

As described above, the light guide 3000 according to the embodiments of the present disclosure may be fitted to a human face like glasses. If the light that is emitted from, for example, an image display element is collimated and is made incident on the optical entrance 8, as described above, the image that is formed by, for example, the image display element can be observed as a virtual image. As the light guide 3000 according to the above embodiments of the present disclosure has a transparent body, the scene around the image can be observed together with the image.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be extracted. Further, elements according to varying embodiments or modifications may be combined as appropriate.

This patent application is based on and claims priority to Japanese Patent Application Nos. 2020-007085 and 2020-050321, filed on Jan. 20, 2020, and Mar. 19, 2020, respectively, in the Japan Patent Office, the entire disclosures of which are hereby incorporated by reference herein.

REFERENCE SIGNS LIST

100 Image display element
200 Optical system
300 Light guide
8, 108, 301 Optical entrance
30, 130, 302: Light guiding unit
303: Extraction unit
40, 140, 304: Light beam ejection unit
310: First light guiding member
320: Second light guiding member
321: Edge face
401: Reflective or transmissive film
402: Adhesive layer
1000: Virtual-image display device
1 Mirror
2, 102 First reflection plane
3, 103 Second reflection plane
4 Optical-path separator
5 Image extraction unit
6 First light wave
7 Second light wave
8 Optical entrance
9 Optical-path not-separating region
10 Optical-path separation region
11 Prism
12 Crystalline lens
14 Retina
15 Eye box
16 Dropout error
21 Boundary
25 Area at which light flux overlap with different light flux
26 Light beam whose reflection angle on second reflection plane 3 is $\theta_2$
27 Light beam whose reflection angle on second reflection plane 3 is $\theta_2 + \Delta\theta$
28 Area of second reflection plane 3 that totally reflects light for the first time
30 Light guiding unit
33, 133 Sub-reflection plane
40 Light beam ejection unit
50 Image display apparatus
51 Collimator optical system
52 Light source
3000 Light guide
4000 Light guide
410 Frame
$\theta_1$ First reflection angle
$\theta_2$ Second reflection angle
W2 First light-flux width
W2' Second light-flux width
W1 Third light-flux width
d Distance
D Distance
101 Light source

The invention claimed is:

1. A device comprising:
an optical entrance having a plane to receive light;
a light guide to guide the light incident on the optical entrance with repeated reflection;
a light beam ejector to eject the light to an outside of the device; and
an extractor to reflect the light guided by the light guide toward the light beam ejector,
wherein the light guide includes:
a first reflection plane and a second reflection plane that face one another and are parallel with each other, and
at least one optical-path separator disposed between the first reflection plane and the second reflection plane,
wherein the at least one optical-path separator is detached from the optical entrance and disposed between the first reflection plane and the second reflection plane,
wherein the second reflection plane is disposed further from the light beam ejector than the optical-path separator, and
wherein the optical-path separator is to transmit the light that is reflected by the second reflection plane at a first reflection angle and travels toward the optical-path separator, and reflect, toward the second reflection plane, the light that is reflected by the second reflection plane at a second reflection angle wider than the first reflection angle and travels toward the optical-path separator.

2. The device according to claim 1, wherein:
a relation of $$W2' \geq 2 \times W2$$

is satisfied, where
W2' denotes a light-flux width of a light initially reflected by the second reflection plane at the second reflection angle, and W2 denotes a light-flux width of a light initially reflected by the second reflection plane at the second reflection angle in an area where the optical-path separator is disposed, and
an equation $$W2/(\sin(\theta 2))=d$$

is satisfied, where
θ2 denotes the second reflection angle,
W2 denotes the light-flux width of the light initially reflected by the second reflection plane at the second reflection angle in the area where the optical-path separator is disposed, and
d denotes a distance between the second reflection plane and optical-path separator.

3. The device according to claim 1, wherein:
an equation $$W1/(2\times\sin(\theta 1))=D$$

is satisfied, where
W1 denotes a light-flux width of a light reflected by the second reflection plane at the first reflection angle,
θ1 denotes the first reflection angle, and
D denotes a distance between the first reflection plane and the second reflection plane.

4. The device according to claim 1, wherein:
the optical-path separator has a plane facing the second reflection plane, and
a critical angle of the light incident on the plane of the optical-path separator facing the second reflection plane is wider than a critical angle of the light incident on the second reflection plane.

5. The device according to claim 1, wherein:
the optical-path separator includes i thin films that are disposed on top of one another and are parallel to each other,
the i thin films are separated from each other,
a formula $$d(m)<d(m-p)<D$$

is satisfied, where
d (m) denotes a distance between the second reflection plane and m-th one of the i thin films of the optical-path separator with reference to the first reflection plane,
D denotes a distance between the first reflection plane and the second reflection plane, and
p denotes any desired natural number that is equal to or greater than one and less than i, and a formula $$n(m-p)<n(m)<N$$

is satisfied, where
n (m) denotes a refractive index of the m-th one of the i thin films of the optical-path separator,
N denotes a refractive index of the light guide,
i denotes a natural number equal to or greater than two,
m denotes a natural number equal to or greater than two but equal to or less than i, and
p denotes a natural number equal to or greater than one but less than m.

6. The device according to claim 1, wherein:
the light guide includes a plurality of sub-reflection planes parallel to the second reflection plane and not overlapping each other, and
the light guide includes a plurality of image extractors through which the light is taken out to a side of the first reflection plane between a pair of the plurality of sub-reflection planes that are adjacent to each other and between the second reflection plane and one of the plurality of sub-reflection planes adjacent to the second reflection plane.

7. The device according to claim 6, wherein:
a distance between the plurality of sub-reflection planes and the first reflection plane gets narrower as departing from the optical entrance.

8. The device according to claim 6, wherein:
each one of the plurality of image extractors is a reflection plane forming an obtuse angle with the second reflection plane.

9. The device according to claim 6, further comprising:
at least one optical-path separator between the first reflection plane and at least half of the plurality of image extractors.

10. The device according to claim 1, wherein:
the light includes a plurality of bundles of light flux, and
the plurality of bundles of light flux with a same angle of view are parallel to each other.

11. A virtual-image display, comprising:
an image display element;
the device according to claim 1; and
an optical system to make an image light emitted from the image display element be incident on the optical entrance of the device,
wherein the device guides the image light emitted from the image display element and ejects the image light to form a virtual image.

* * * * *